US009020241B2

(12) United States Patent
Leichsenring et al.

(10) Patent No.: US 9,020,241 B2
(45) Date of Patent: Apr. 28, 2015

(54) IMAGE PROVIDING DEVICE, IMAGE PROVIDING METHOD, AND IMAGE PROVIDING PROGRAM FOR PROVIDING PAST-EXPERIENCE IMAGES

(75) Inventors: Germano Leichsenring, Kanagawa (JP); Tomoko Katayama, Osaka (JP); Hidetaka Oto, Osaka (JP); Nobuki Tominaga, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 271 days.

(21) Appl. No.: 13/580,027

(22) PCT Filed: Feb. 29, 2012

(86) PCT No.: PCT/JP2012/001390
§ 371 (c)(1),
(2), (4) Date: Aug. 20, 2012

(87) PCT Pub. No.: WO2012/117729
PCT Pub. Date: Sep. 7, 2012

(65) Prior Publication Data
US 2013/0071012 A1 Mar. 21, 2013

Related U.S. Application Data

(60) Provisional application No. 61/448,754, filed on Mar. 3, 2011.

(51) Int. Cl.
*G06K 9/00* (2006.01)
*G06K 9/80* (2006.01)
(Continued)

(52) U.S. Cl.
CPC . *G06K 9/80* (2013.01); *G06T 19/00* (2013.01); *H04N 13/0022* (2013.01); *H04N 13/0066* (2013.01)

(58) Field of Classification Search
None
See application file for complete search history.

(56) References Cited

U.S. PATENT DOCUMENTS 5,953,014 A * 9/1999 Wood .............................. 345/422
6,335,765 B1 * 1/2002 Daly et al. ..................... 348/586
(Continued)

FOREIGN PATENT DOCUMENTS

JP 11-514118 11/1999
JP 2006-012161 1/2006
(Continued)

OTHER PUBLICATIONS

Real time panoramic Mosaics and Augmented Reality—Jethwa—British Machine Vision Conference 1998 Doi 10-5244.*
(Continued)

*Primary Examiner* — Chan Park
*Assistant Examiner* — Iman K Kholdebarin
(74) *Attorney, Agent, or Firm* — Greenblum & Bernstein, P.L.C.

(57) ABSTRACT

A image providing device provides a user with realistic and natural past-experience simulation through stereoscopic photographs. Specifically, feature-point extractors extract feature points from a foreground image and a background image, respectively. A stereoscopic matching module searches for pairs of feature points matching between the foreground image and the background image and obtains using the feature point pairs a transformation matrix for projecting the foreground image onto the background image. The transformation by the transformation matrix obtained by the matching unit is applied to foreground depth data, which is depth data of the foreground image. Lastly, depth based rendering is performed based on the transformed foreground depth data to obtain two or more viewpoint images corresponding to the foreground image.

9 Claims, 27 Drawing Sheets

(51) Int. Cl.
*G06T 19/00* (2011.01)
*H04N 13/00* (2006.01)

(56) References Cited

U.S. PATENT DOCUMENTS

| | | | |
|---|---|---|---|
| 6,711,293 B1 | 3/2004 | Lowe | |
| 7,084,879 B2* | 8/2006 | Sevigny | 345/581 |
| 7,142,209 B2* | 11/2006 | Uyttendaele et al. | 345/427 |
| 7,286,143 B2 | 10/2007 | Kang et al. | |
| 7,292,257 B2 | 11/2007 | Kang et al. | |
| 7,598,952 B1* | 10/2009 | O'Donnell | 345/426 |
| 8,301,013 B2 | 10/2012 | Yamashita et al. | |
| 8,411,932 B2* | 4/2013 | Liu et al. | 382/154 |
| 8,717,405 B2* | 5/2014 | Li et al. | 348/14.08 |
| 2004/0179262 A1* | 9/2004 | Harman et al. | 359/462 |
| 2004/0196299 A1* | 10/2004 | Di Lelle et al. | 345/619 |
| 2005/0285875 A1* | 12/2005 | Kang et al. | 345/629 |
| 2005/0286759 A1 | 12/2005 | Zitnick, III et al. | |
| 2006/0072852 A1* | 4/2006 | Kang et al. | 382/294 |
| 2007/0279412 A1* | 12/2007 | Davidson et al. | 345/419 |
| 2008/0018732 A1* | 1/2008 | Moller | 348/51 |
| 2008/0150945 A1* | 6/2008 | Wang et al. | 345/427 |
| 2008/0165181 A1* | 7/2008 | Wang et al. | 345/419 |
| 2008/0186330 A1* | 8/2008 | Pendleton et al. | 345/619 |
| 2010/0074594 A1 | 3/2010 | Nakamura et al. | |
| 2010/0104262 A1 | 4/2010 | Kanamaru et al. | |
| 2010/0142924 A1 | 6/2010 | Yamashita et al. | |
| 2010/0149210 A1* | 6/2010 | Matsunaga et al. | 345/625 |
| 2010/0201681 A1* | 8/2010 | Criminisi et al. | 345/419 |
| 2010/0208942 A1* | 8/2010 | Porter et al. | 382/106 |
| 2010/0226628 A1 | 9/2010 | Yamaji et al. | |
| 2011/0034176 A1* | 2/2011 | Lord et al. | 455/450 |
| 2011/0080462 A1 | 4/2011 | Yamaji et al. | |
| 2011/0102424 A1* | 5/2011 | Hibbert et al. | 345/419 |
| 2011/0249090 A1* | 10/2011 | Moore et al. | 348/43 |
| 2014/0049536 A1* | 2/2014 | Neuman et al. | 345/419 |

FOREIGN PATENT DOCUMENTS

| | | |
|---|---|---|
| JP | 2010-183560 | 8/2010 |
| JP | 2010-193458 | 9/2010 |
| WO | 97/47141 | 12/1997 |

OTHER PUBLICATIONS

U.S. Appl. No. 13/638,136 to Tomoko Katayama et al., which was filed on Sep. 28, 2012.

U.S. Appl. No. 13/635,820 to Keiichi Tanaka et al., which was filed on Sep. 18, 2012.

International Search Report in PCT/JP2012/001390, dated Apr. 10, 2012.

Iizuka et al., "An efficient modeling system for 3-D scenes from an single landscape image", Department of Computer Science, University of Tsukuba, JPSJSIG Technical Report, vol. 2011-CG-142, No. 142, pp. 1-6 (Feb. 9, 2011).

\* cited by examiner

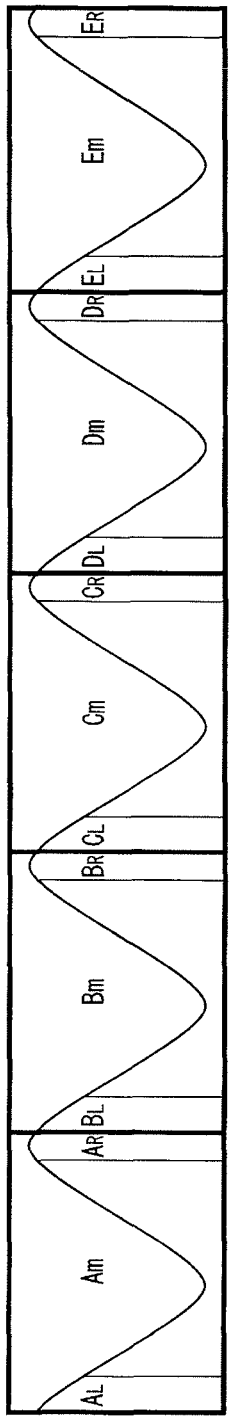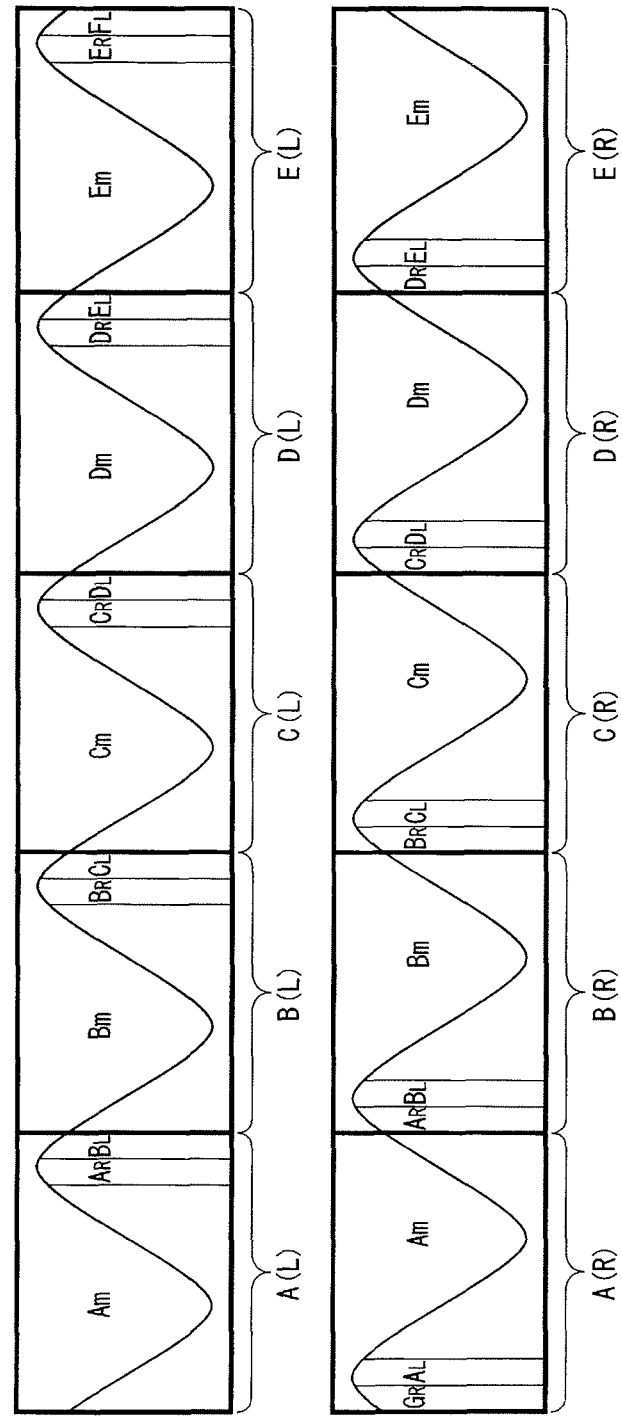
FIG. 5A
FIG. 5B
FIG. 5C

FIG. 6A
After left shift
FIG. 6B
After right shift
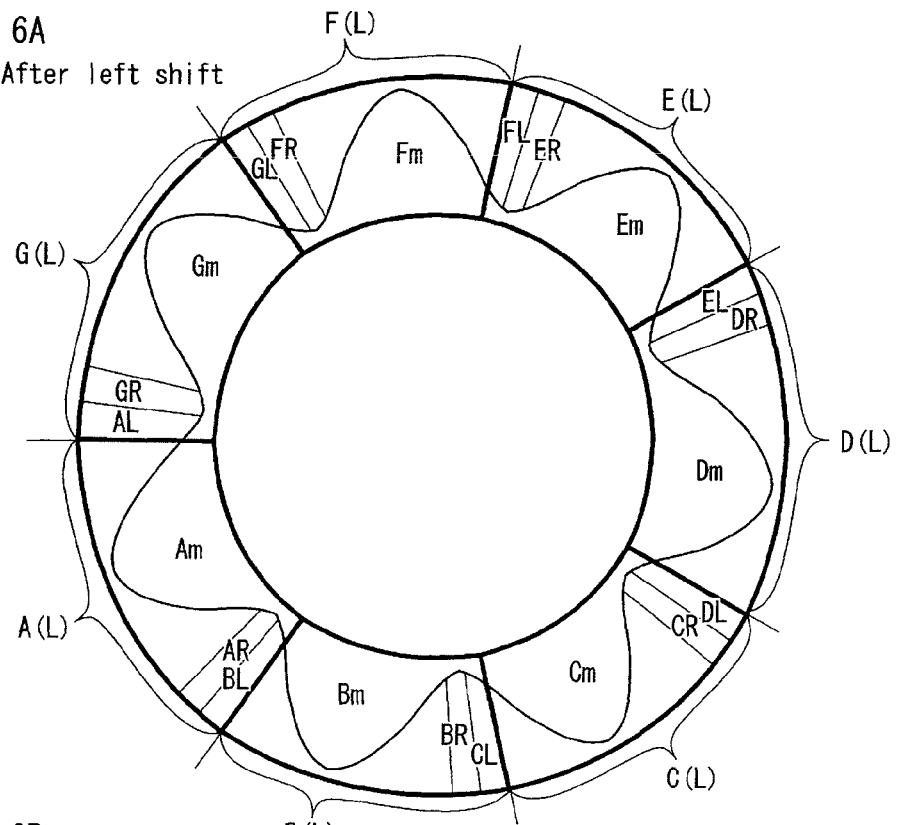
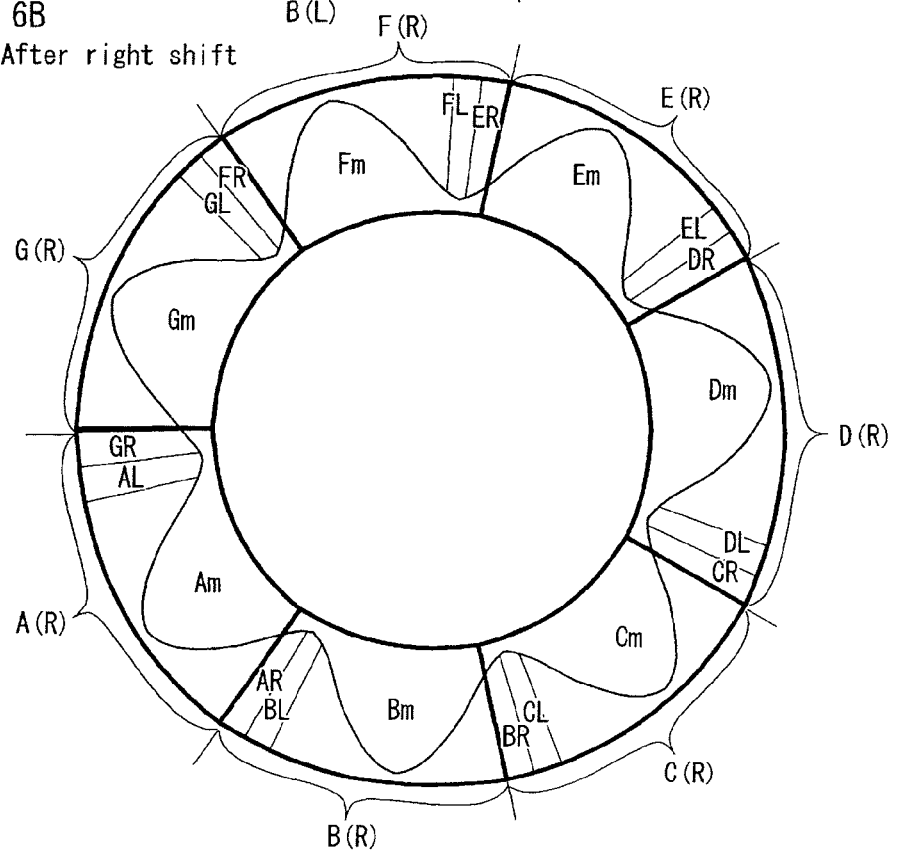

Feature point matching between foreground image and background image applied on sphere Foreground image FIG. 14A
Stereoscopic photograph file
| Data name | Exemplary data |
|---|---|
| 502 Image capturing date | February 12, 2011  10:23 |
| 503 Size | 1920 × 1080 pixels |
| 504 Compressed left-view image | JPEG compressed data |
| 505 Compressed right-view image | JPEG compressed data |
| 506 Latitude | 25° 24' 31".76  S |
| 507 Longitude | 49° 19' 08".09  W |
| 508 Altitude | 929 m |
| 509 Direction | 33° 21' |
| 510 Inclination angle | 13° 55' |
FIG. 14B
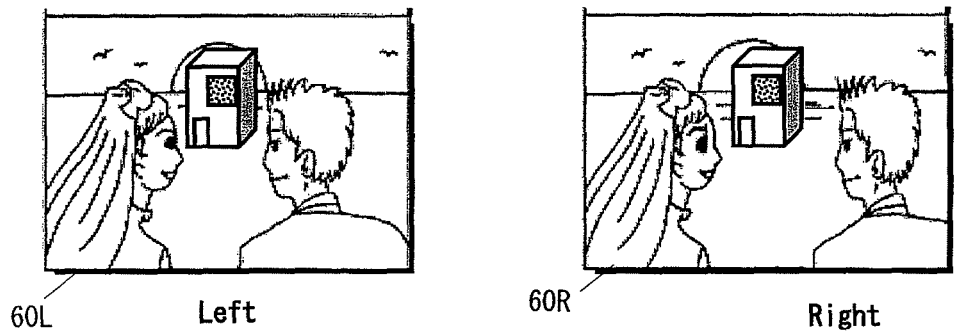
60L Left    60R Right
FIG. 14C
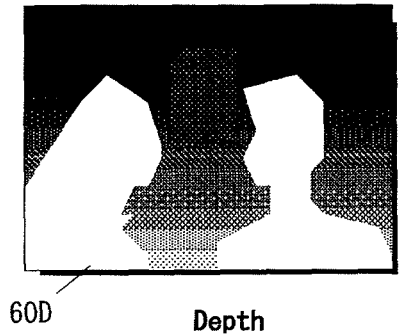
60D  Depth

FIG. 15A

Stereoscopic SV viewpoint file

| Data name | Exemplary data |
|---|---|
| Image capturing date | April 1, 2004  9:03 |
| Size | 3584 × 2048 pixels |
| Compressed Mercator image | JPEG compressed data |
| Latitude | 25° 24' 11".99  S |
| Longitude | 49° 19' 88".10  W |
| Altitude | 929m |
| Direction | 0° |
| Inclination angle | 0° |
| Compressed Mercator depth | PNG compressed data |

502 — Image capturing date
503 — Size
511 — Compressed Mercator image
506 — Latitude
507 — Longitude
508 — Altitude
509 — Direction
510 — Inclination angle
512 — Compressed Mercator depth

FIG. 15B

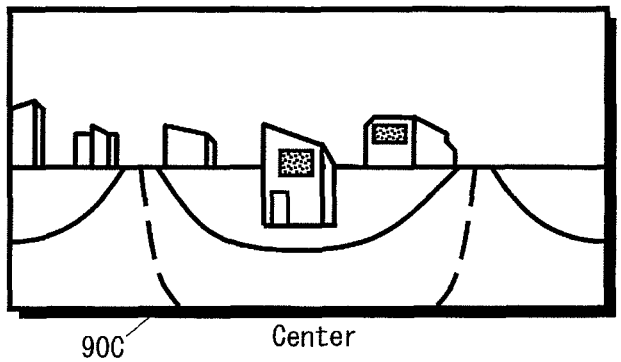

90C  Center

FIG. 15C

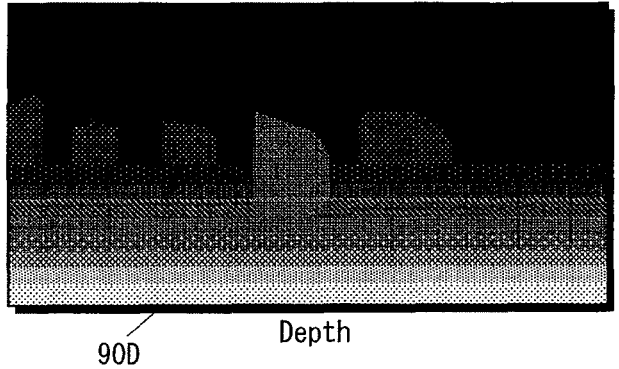

90D  Depth

Feature point

Feature point 701

| Data name | Exemplary data |
|---|---|
| Center | 235.2 × 198.9 pixels |
| Radius | 17.1 pixels |
| Direction | 7° 15' |
| Feature value | 64 three-dimensional vectors |

702 — Center
703 — Radius
704 — Direction
705 — Feature value

FIG. 17
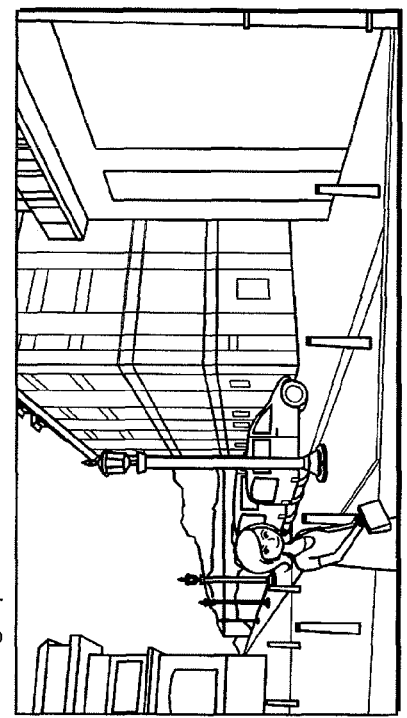
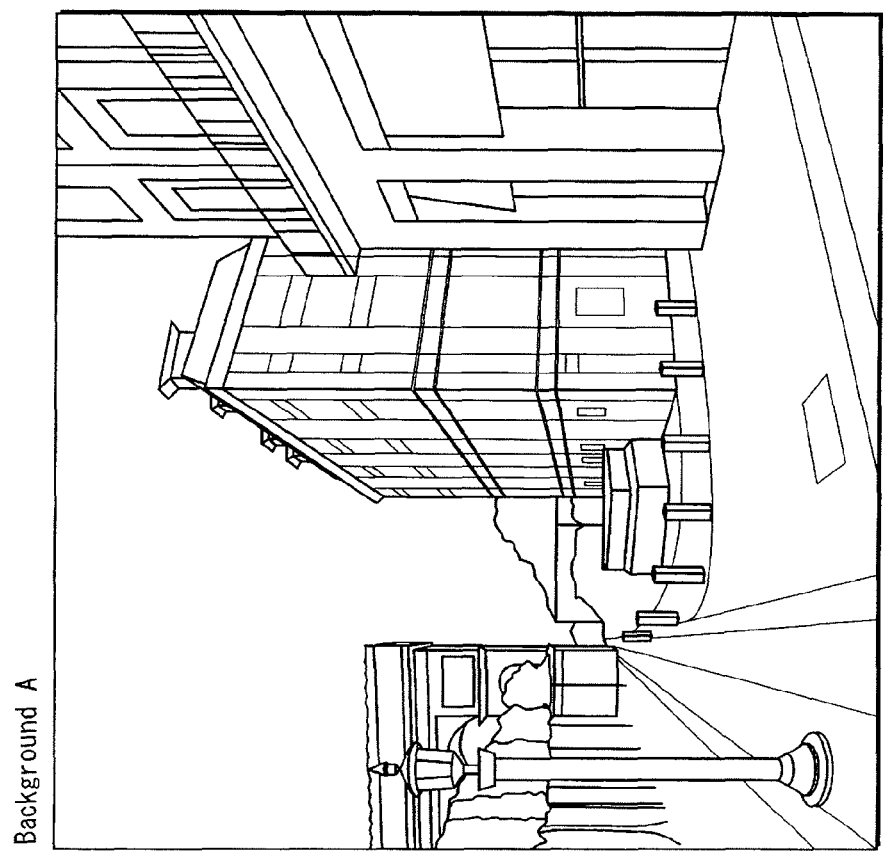

Photograph B

Feature point pairs: F1 & f1,
F2 & f2, and F3 & f3

Background A

IMAGE PROVIDING DEVICE, IMAGE PROVIDING METHOD, AND IMAGE PROVIDING PROGRAM FOR PROVIDING PAST-EXPERIENCE IMAGES

CROSS-REFERENCE TO RELATED APPLICATIONS

This application claims the benefit of U.S. Provisional Application No. 61/448,754, filed on Mar. 3, 2011, the contents of which are herein incorporated by reference in its entirety.

TECHNICAL FIELD

The present invention belongs to the technical field of image synthesis.

BACKGROUND ART

Image synthesis is a technique of analyzing a background image to select a suitable position in the background image for combining a foreground image and combining the foreground image onto the background image. For example, a foreground image may be a user's photograph taken for personal use and a background image may be a street view of the location where the photograph was taken. A joint image of the foreground and the background image allows the user to re-experience the atmosphere of the time and place.

More specifically, a service called street view search is currently available on the Internet and background images taken around the world are stored on the servers. By downloading a desired background image and compositing the background image with an image of a person taken by a user, the atmosphere of the time and place can be reproduced with many angles. The function termed "past-experience simulation" allows a user to re-experience the atmosphere of the time and the place through the combined use of user's personal photographs and the street view search service.

CITATION LIST

Patent Literature

[Patent Literature 1]
U.S. Pat. No. 6,711,293 B1

SUMMARY OF INVENTION

Technical Problem

As a further development of the function of providing past-experience simulation, attempts are being made to create composite images of a stereoscopic photograph as a foreground image and a stereoscopic street view as a background image. Stereoscopic viewing is realized by two schemes. In one scheme, two viewpoint images, namely a right-view image and a left-view image, are generated using a depth image. In the other scheme, two viewpoint images are acquired by image capturing. These viewpoint images differ in depth of buildings appearing in the images. In other words, although captured at the same location on the Earth, the images captured by cameras differ in depth of people or building appearing in the images. Therefore, by simply merging a photograph and a street view, depths in the resulting stereoscopic image will be inconsistent and thus annoying to the eye. As disclosed in Patent Literature 1, one way to address the above problem is to identify feature points to appropriately adjust a foreground image and a background image in two-dimensional position. Yet, there may be a case where the background image and the photograph largely differ in their depth images, which results in that an object in the photograph appears too close or too far. In such a case, the two-dimensional adjustment to appropriately correlate the images as disclosed in Patent Literature 1 may not be sufficient to remove visual discomfort caused by depth inconsistency.

The present invention aims to provide an image providing device capable of producing naturally-looking stereoscopic images by compositing a foreground image on a background image, even if the foreground and background images are captured under totally different conditions.

Solution to Problem

Although the technical problem to be solved is presented on the precondition that that a background image is a street view and a foreground image is a photograph, this is merely one familiar example used to explain the technical problem. The technical problem solved by the present invention is not limited to the case of such specific background and foreground images. That is, the technical problem of the present invention is to provide an overall solution to remove visual inconsistencies from a composite image of any two images with different depths, which is a problem faced by those skilled in the art in applying image composition techniques into industry products.

An image providing device coving the above problem is for compositing foreground image data with background image data after applying the background image data to an inner surface of a three-dimensional model in a three-dimensional modeling space and includes: an extracting unit operable to extract feature points from foreground image data and from background image data; a matching unit operable to search for a pair of feature points matching between the foreground image data and the background image data and obtain a transformation matrix for projecting the foreground image data onto the background image data, by using the pair of matching feature points; a transformation unit operable to apply, to foreground depth data associated with the foreground image data, a transformation represented by the transformation matrix obtained by the matching unit; a depth-based rendering unit operable to perform depth-based rendering of the foreground image data based on the transformed foreground depth data, thereby to generate two or more pieces of viewpoint image data corresponding to the foreground image data; and a compositing unit operable to composite the two or more pieces of viewpoint image data corresponding to the foreground image data with two or more pieces of viewpoint image data corresponding to the background image data.

Advantageous Effect of the Invention

To project a foreground image onto a background image, an appropriate transformation matrix is acquired and the depth image of the foreground image is converted by using the transformation matrix. Therefore, the depth image of the foreground image resulting from the conversion shows depths in consistency with the depths shown in the background image. Preparing two or more viewpoint images from a foreground image based on the depth image converted in the above manner eliminates the possibility of any awkward-looking stereoscopic image in which the foreground image appears too close or too far. Consequently, composite images which produce an appropriate stereoscopic effect are generated.

Since the stereoscopic viewing can be perceived without causing awkward or unnatural feelings to the viewer, the image providing device holds a promise for development of a new network service of providing past-experience simulations. In addition, provision of the function adds high value to household electrical appliances, such as television receivers, recorders, camcorders, and digital cameras.

The invention pertaining to an image providing device having the means for solving the above problem is defined in claim 1, which is the top claim of the present application. Additional invention-specifying matters may be added to the invention pertaining to the image providing device. Also, the matters specifying the invention pertaining to the system may be replaced with other matters to limit a broader or more general concept to a narrower or more specific concept. With such arraignment, the invention pertaining to the playback apparatus described above may achieve additional advantageous effects. The variations of adding or narrowing the matters specifying the invention include the following. In the claims, the variations are defined in the dependent claims starting from claim 2.

Optionally, a transformation matrix H may be given by Formula 1 below.

$$\vec{Q} = \begin{bmatrix} X_F \\ Y_F \\ Z_F \end{bmatrix}$$

$$\vec{q} = \begin{bmatrix} x_f \\ y_f \\ 1 \end{bmatrix}$$

$$\vec{q} = \overrightarrow{HQ}$$

[Formula 1]

where xf and yf are X and Y coordinates of a feature point f(xf, yf) on the foreground image data, XF and YF are X and Y coordinates of a corresponding feature point F(XF, YF) on the background image data to the feature point f(xf, yf), and ZF is a depth value of the feature point F(XF, YF).

Since the above matrix is derived with the use of an existing CG right-view image, such as OPEN-GL, implementation of the above functionality on digital home appliances would be easy.

Optionally, the image providing device may further include: an acquisition unit operable to acquire photographic image data captured by a stereoscopic camera, the captured photographic image data including right-view photograph data and left-view photograph data. The transformation unit may be further operable to determine one of the right-view photograph data and the left-view photograph data as base image data, by comparing an image capturing direction of the background image data with an image capturing direction of each photographic image. The foreground image data may be the one of the right-view photograph data and the left-view photograph data determined as the base image data.

As above, either the right- or left-view photograph data is determined as the base image data by comparing the image capturing direction of the background image and that of each photographic image. This ensures to minimize awkwardness resulting from the image capturing direction of the photograph not matching any of the eight directions in the street view.

Optionally, the image providing device image may further include: a depth image generating unit operable to generate a depth image of the photographic image data from the right-view photograph data and the left-view photograph data. The foreground depth data subjected to the transformation by the transformation unit may be the depth image generated by the depth image generating unit. Even if the foreground image is captured by a camera not having the capability of acquiring a depth image, an appropriate depth image can still be acquired.

Here, one of the right-view photograph data and the left-view photograph data not determined as the base image data is designated as non-base image data. Optionally, the depth-based rendering unit may be operable to re-generate image data by applying horizontal shift to pixels of the non-base image data according to depths represented by the foreground depth data. The two or more pieces of viewpoint image data may be composed of the non-base image data and the re-generated image data.

Two or more viewpoint images corresponding to a foreground image are generated by software or hardware that can implement depth image based rendering (DIBR).

Optionally, in the image providing device, a permissible level of a depth of feature points to be searched for may be set in advance in the image providing device. When searching the foreground image for feature points for matching with a street view viewpoint, the matching unit may be operable to exclude any feature point having a median of depth distribution falling outside a permissible range, and perform matching between the background image data and the foreground image data using feature points each having a median of depth distribution falling within the permissible range.

Pixels at a distant location, such as pixels representing clouds in the sky, are excluded from the matching. The above approach eliminates a risk of performing erroneous matching. For example, there is no risk of matching cloud appearing in the foreground image with cloud appearing in the background image. Thus, the transformation matrix is contained with high accuracy.

Optionally, the image providing device may further include: a transmitting unit operable to transmit, to an image collection server, an image acquisition request that specifies a location of a current viewpoint in global geographic information; and a receiving unit operable to receive a street view file transmitted from the image collection server in response to the image acquisition request. The background image data may be contained in the received street view file. Since the background image is transmitted in response to an image acquisition request that uses global geographic information, the user staying at home is allowed to download an image of any desired location over the world and composite the downloaded image with user's photograph. This serves allows the user to have a virtual experience of traveling all over the world.

Optionally, the image providing device may further include: a reading unit operable to access a recording medium to read a stereoscopic photograph file. The stereoscopic photograph file may contain left-view photograph data, right-view photograph data, and geographic information. The transformation unit may be further operable to determine one of the right-view photograph data and the left-view photograph data as base image data, by comparing an image capturing direction of the background image data with an image capturing direction of each photographic image. The foreground image may be the one of the right-view photograph data and the left-view photograph data determined as the base image data. The transmitting unit may be operable to generate, with use of the geographic information contained in the stereoscopic photograph file, an image acquisition request that specifies a current viewpoint and transmit the image acquisition request to the image collection server. The street view file transmitted from the image collection server may have a location attribute matching the geographic information included in the image acquisition request. As above, a desired street view file is acquired by causing the server to conduct a search for background images, using the geographic information contained in the photograph file as a keyword. Consequently, by integrating the image providing device into a digital television receiver, a new service is provided through a combined use of the digital television receiver and a stereoscopic camera. This provides product differentiation against competing products when selling digital television receivers packaged with a stereoscopic camera.

Optionally, the background image may be a panoramic image as seen from a geographic location corresponding to the geographic information included in the image acquisition information. The user is allowed to freely change the line-of-sight within the angular range covered by the panoramic view image, so that richer past-experience simulation is provided.

BRIEF DESCRIPTION OF DRAWINGS

FIGS. 5A-5C illustrate the processes for generating a multi-viewpoint image from background images applied to the inner surface of a sphere.

FIGS. 6A and 6B each illustrate the spherical model onto which a left-shifted or right-shifted panoramic image is applied.

FIG. 14A illustrates the data structure and example data of a stereoscopic photograph file according to Embodiment 1, FIG. 14B illustrates left- and right-view image data compressed in the JPEG format, and FIG. 14C illustrates a depth image.

FIGS. 15A, 15B, and 15C illustrate the data structure and example data of a stereoscopic SV viewpoint file according to Embodiment 1.

FIG. 17 illustrates, as one example, a photograph and a background image that are subjected to feature matching.

DESCRIPTION OF EMBODIMENTS

The invention pertaining to an image providing device having the means to solve the above problem may be implemented as a digital home appliance for playing back street views, whereas the invention pertaining to an integrated circuit may be implemented as a system LSI embedded in such a digital home appliance. The invention pertaining to an image providing method may be implemented as a series of steps performed in proper time sequence by such a digital home appliance. The invention pertaining to an image providing program may be implemented as an executable program that is stored on a non-transitory computer-readable recording medium for installation into a digital home appliance. Prior to the description of an image providing device, the following describes the overall configuration of a stereoscopic global view search service, which is the environment in which the image providing device is used.

Figure 1:
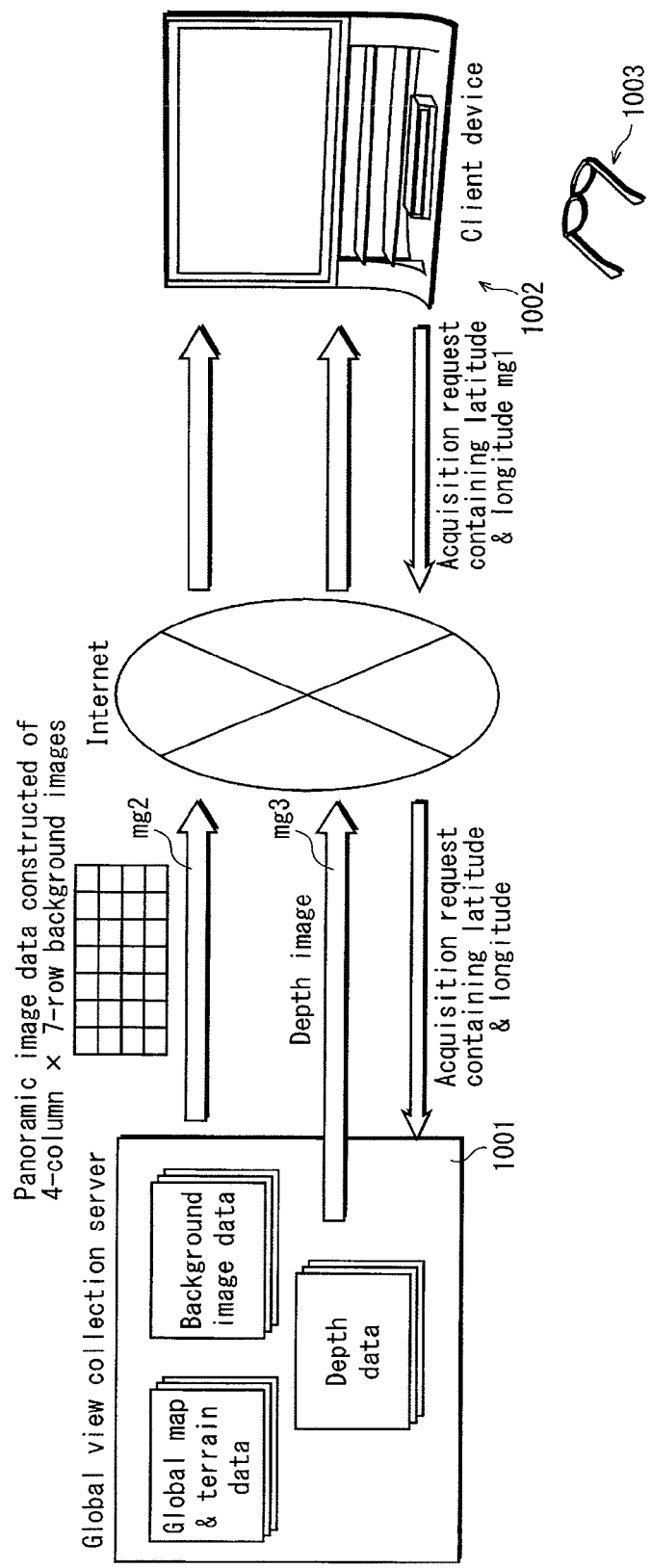
FIG. 1 illustrates the overall configuration of a stereoscopic global view search service.

FIG. 1 illustrates the overall configuration of the stereoscopic global view search service. A global view collection server 1001 stores background images collected around the world, and also stores depth data and terrain data of each background image. Upon request from client devices, the global view collection server 1001 transmits panoramic viewpoint images along with the associated depth images and terrain data. Background images are taken by cameras mounted atop a passing vehicle dedicated for image capturing. Depth data represents the depths to landmarks appearing in a captured image. Panoramic viewpoint images represent a view of surroundings as seen from a geographic location that matches the geographic information specified in an image acquisition request transmitted to the global view collection server 1001. A panoramic viewpoint image presents a view covering a relatively wide angle, such as 90°, 120°, 180°, and 360°, for example. Specifically, a panoramic viewpoint image covering 360° may also be referred to as a full view panoramic image or wraparound image. For the sake of convenience, the following description is given on the assumption that panoramic viewpoint images are 360° panoramic images, which are simply referred to as "panoramic images". A vehicle for image capturing is equipped with multiple cameras and captures four images in a vertical direction and seven images horizontally around (4 columns×7 rows) for each current location of the vehicle. A depth image represents depths in a background image by showing pixel luminance in proportion to the distance to surfaces of landmarks from the viewpoint. That is, each pixel in a depth image is a piece of depth information indicating the depth to a corresponding pixel in the background image.

A client device 1002 is a network home appliance, such as a digital television receiver, and transmits a download request mg1 to a server and receives a panoramic image mg2 and a depth image mg3 from the server. With the use of panoramic images, the client device 1002 presents a 3D street view. A download request includes information specifying the latitude, longitude, and altitude of a desired location on the Earth to request a panoramic image of the location to be transmitted.

A pair of eyeglasses 1003 is for use by a user to see street views stereoscopically. Stereoscopic viewing of a street view is realized by using multi-viewpoint images. The multi-viewpoint images refer to a set of viewpoint images as seen from two or more viewpoints for realizing stereoscopic viewing, such as left-, right-, central-, upper-right-, lower-right-, upper-left-, and lower-left-view images. Yet, describing each and every possible combination of multi-viewpoint images is rather complicated. For the sake of brevity, in the following description, multi-viewpoint images are assumed to be a minimal set of viewpoint images, namely a left-view image and a right-view image making up a stereo pair.

Figure 2:
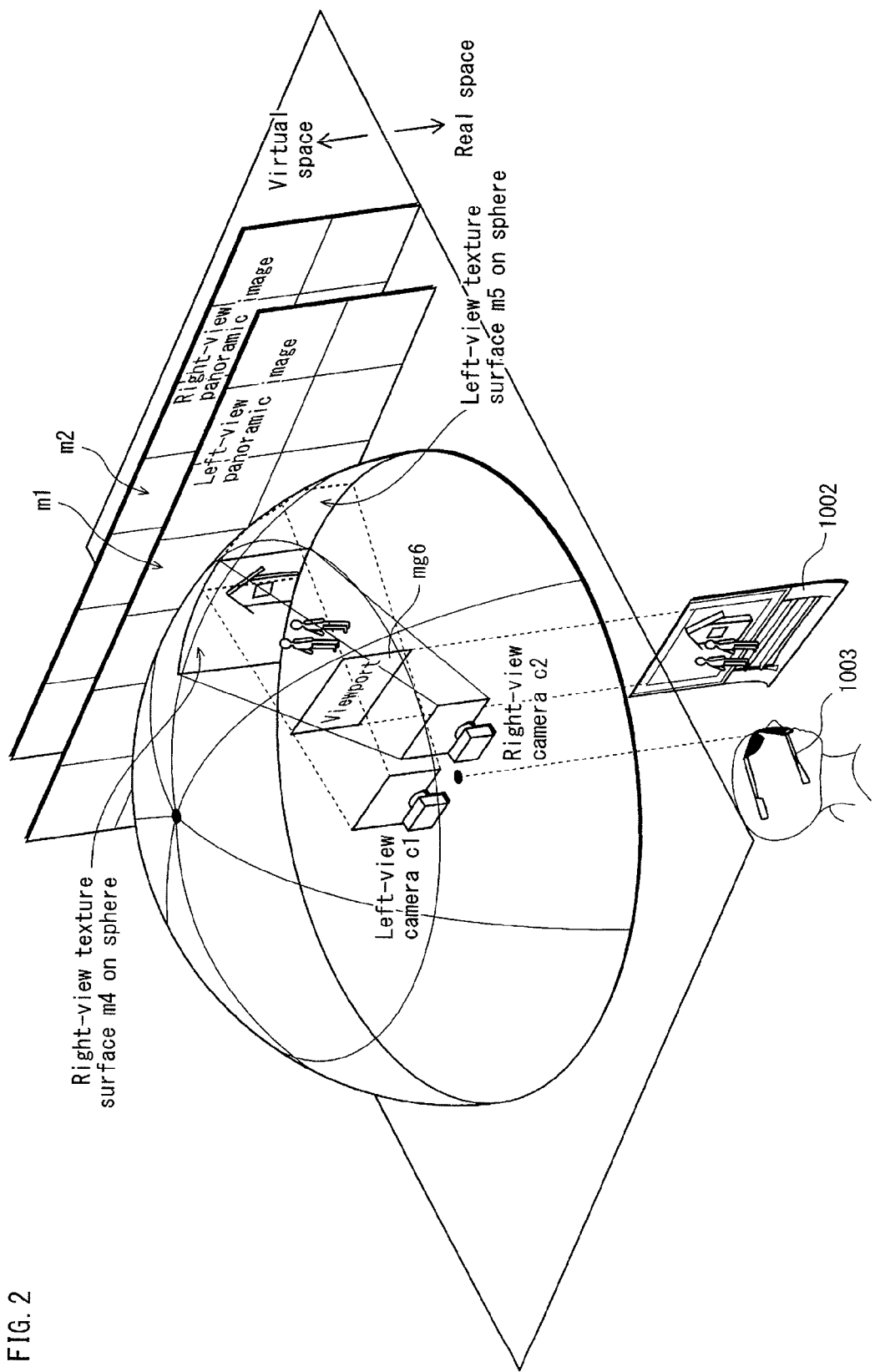
FIG. 2 schematically illustrates a virtual space pertaining to a street view.

FIG. 2 schematically illustrates a stereoscopic street view system. The upper half of the figure represents a virtual space in which a model is present, whereas the lower half of the figure represents a real space in which the client device 1002 and the eyeglasses 1003 are physically present.

First, a description of the virtual space is given. A virtual space is a three-dimensional modeling space defined on a coordinate system for describing the geometric shape of a three-dimensional model. A three-dimensional model may be of any shape, including a cylinder, a circular cone, a delta cone, and a spheroid. For purposes of convenience, the following description is given using a spherical model. The center of a sphere, which is a three-dimensional model, coincides with the camera position. For simplicity, the figure illustrates only one spherical model. However, for stereoscopic viewing, separate spherical models are used for the left-view and right-view. In the figure, the camera CL is located at a position offset to the right from the center of the sphere by the distance p. The camera CR is located at a position offset to the left from the center of the sphere by the distance p. Each of the cameras CL and CR is at the center of the corresponding spherical model used when capturing left- or right-view images.

Angularly upwardly from the three-dimensional model, a panoramic image composed of 4 columns×7 rows background images is applied. Panoramic images include a right-view panoramic image m1 and a left-view panoramic image m2, and right-view texture and left-view texture are applied to different locations in the three-dimensional modeling space. Although the figure illustrates only the upper half of the spherical model, the spherical model also has a lower half. Similarly, although the figure illustrates only the upper half of the panoramic image, the panoramic image has a lower half.

The following is a description of the spherical model. The inner surface of the sphere has a region defined as a right-view texture surface m4 and as a left-view texture surface m5. A texture surface in a spherical model refers to a grid defined by four or three intersection points on the spherical model. Such a grid has the same curvature as the spherical model and defined as part or whole of a triangular strip having each vertex at a point specified by the polar coordinates of the spherical model. In texture mapping, graphics are rendered by designating a triangle strip as a geometry type and assigning the coordinates of the texture buffer storing the background image. A display plane is present at a position closer toward the front than the texture, and a viewport mg6 is defined on the display plane. A viewport indicates the region in the three-dimensional modeling space used for display. Images projected on the viewport are supplied for playback. The viewport is located at the position where the image projection regions of the left-view and the right-view overlap. That is, the viewport for the left-view and the viewport for the right-view are commonly located at the same position.

The texture image applied inside the spherical model is a panoramic image, so that a 360-degree panorama is provided. By developing the spherical model in the three-dimensional modeling space into a Mercator image, a panoramic image is obtained. The number of 2 (column)×7 (row) grids in the semi-sphere is equal to the number of 2 (column)×7 (row) background images stitched into the panoramic image. In other words, the texture mapping is carried out on the individual background images making up the panoramic image, by converting each background image into a texture and applies the texture to a corresponding grid in the spherical model.

This concludes the description of the virtual space. The following now describes the real space.

In the figure, the client device 1002 and a user's head with the eyeglasses 1003 on are illustrated directly below the sphere representing the three-dimensional model. The display screen of the client device 1002 is located directly below the viewport in the spherical model. The eyeglasses 1003 are located slightly farther back from the position that is directly below the cameras CL and CR for the following reason. That is, the cameras CL and CR need to coincide in position to the user's right-view and left-view, so that the eyeglasses 1003 need to be located in the vicinity.

As described above, the positions of the cameras CL and CR coincide with the user's right-view and left-view, while the viewport coincides with the screen of the client device 1002. Thus, stereoscopic images appear between the client device 1002 and the user. In the virtual space, a house illustrated as a plane figure. However, in the real space, the house appears as popping out of the screen of the client device 1002.

Figure 3:
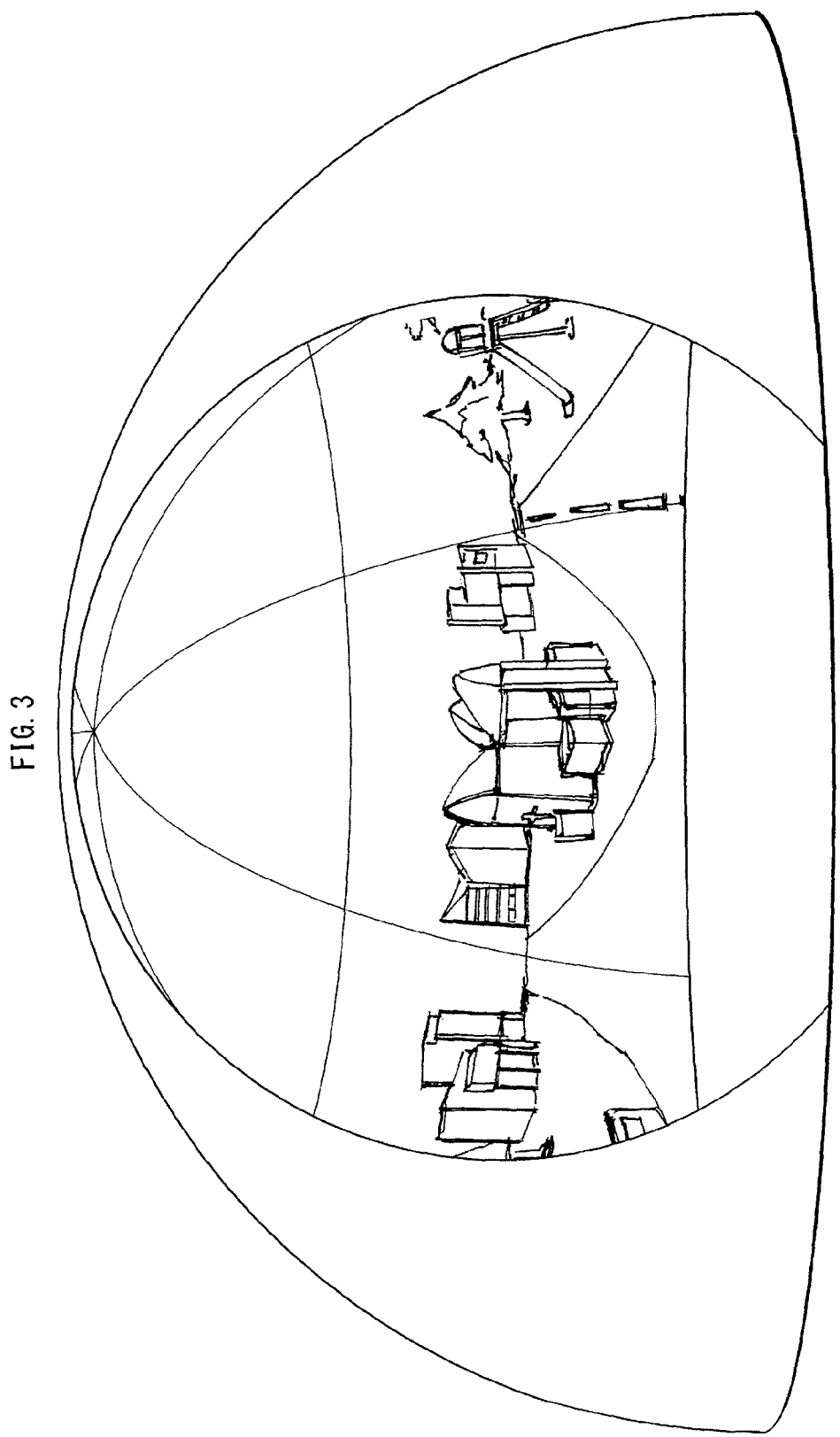
FIG. 3 illustrates a spherical model having background images applied in a row on the inner surface.

FIG. 3 illustrates the texture applied to the inner spherical surface, as seen from the center of the spherical model. More specifically, FIG. 3 illustrates the inner surface of the spherical model where a plurality of background images are applied in a row. In the background images illustrated in FIG. 3, there is a modern-looking church in the front and a playground slide on the right hand side. Since the background images are applied to the inner surface of the sphere, the background images fully surround the camera when seen from the camera located at the center of the circular cross section. The texture applied to the spherical model varies with the location of the viewpoint that is determined by the latitude, longitude, and altitude on Earth. That it, in response to a user operation for changing the viewpoint, the image providing device updates the current viewpoint determined by the world's geographic information (latitude, longitude, altitude, and so on), downloads a panoramic image matching the updated current viewpoint, and applies the panoramic image to the spherical model to carry out re-rendering.

Figure 4A:
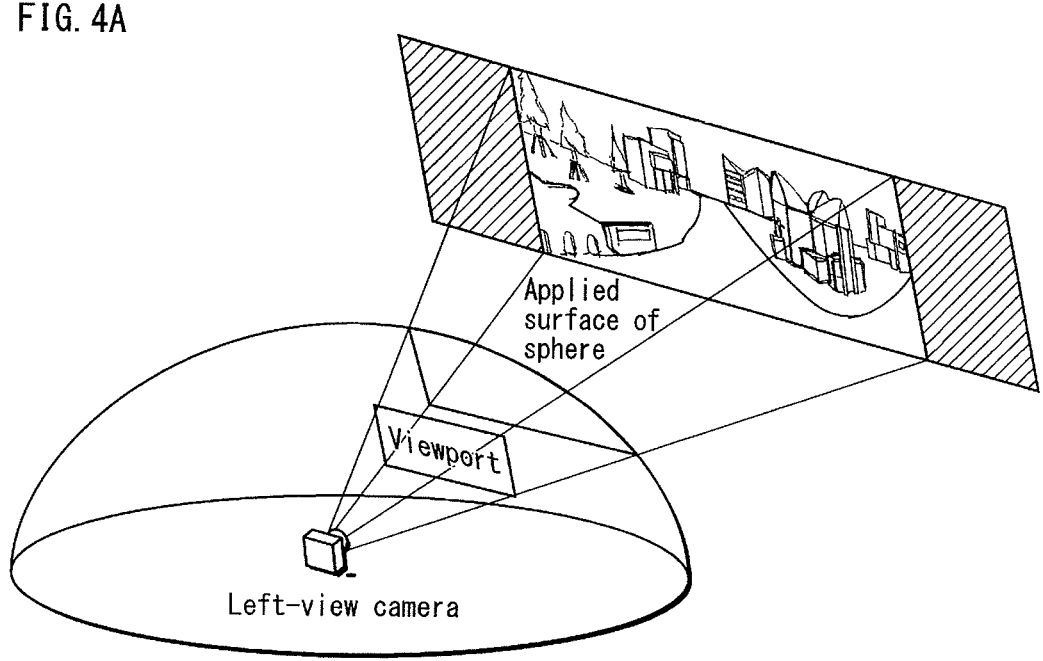
FIGS. 4A and 4B illustrate two spherical models created in a three-dimensional modeling space at the time of executing stereoscopic playback.
Figure 4B:
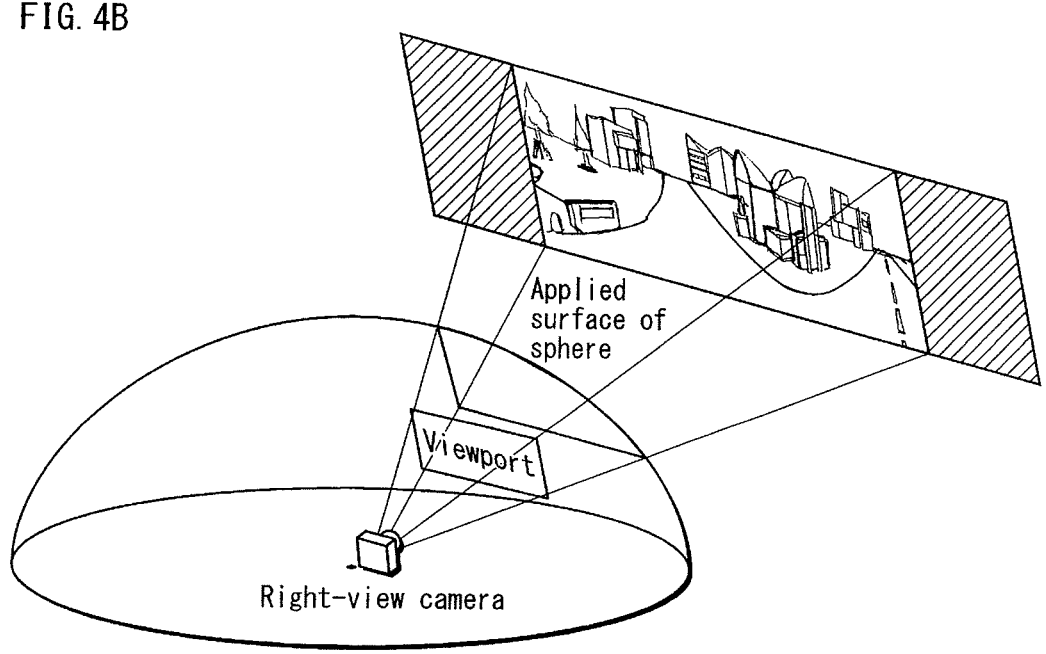

Note that the camera position at the center of the spherical model illustrated in FIG. 2 is for planar viewing and different from the camera position for stereoscopic viewing. For stereoscopic viewing, the camera position is shifted by the distance p from the center of the spherical model, which results in two spherical models in total. FIGS. 4A and 4B illustrate two spherical models created in the three-dimensional modeling space at the time of executing stereoscopic playback. FIG. 4A illustrates a spherical model for left-view. A left-view image generated by DIBR on a combined image constructed of seven background images in a row is applied to the inner surface of the spherical model.

FIG. 4B illustrates a right-view image generated for the image illustrated in FIG. 4A, by depth based rendering using the depth image as a base. The right-view image thus generated by performing depth based rendering of an image constructed of seven background images in a row is applied to the inner surface of the spherical model.

Here, images A, B, C, D, E, F, and G denote the seven images arranged in a row to constitute a panoramic image. The following describes how right- and left-view textures are generated from the images A-G. FIGS. 5A-5C illustrate the processes for generating multiple viewpoint images from the background images applied to the inner surface of the sphere. FIG. 5A illustrates an example in which five of the seven background images constructing the panoramic image are applied to seven divided regions of the spherical internal surface. To be more precise, the background images A, B, C, D, and E are sequentially applied in the order of A→B→C→D→E. The following is a description of the images A, B, C, D, and E illustrated in FIG. 5A. In the image A, each of AL, AM and AR denotes a group of pixels which undergo coordinate change as a result of shift by DIBR. In the image B, each of BL, BM, and BR denotes a group of pixels which undergo coordinate change as a result of shift by DIBR. In the image C, each of CL, CM, and CR denotes a group of pixels which undergo coordinate change as a result of shift by DIBR. In the image D, each of DL, DM, and DR denotes a group of pixels which undergo coordinate change as a result of shift by DIBR. In the image E, each of EL, EM, and ER denotes a group of pixels which undergo coordinate change as a result of shift by DIBR. The groups of pixels in each image together define "V" shapes.

To create a left-view texture, the images A-E are stitched together and then DIBR is performed. As a result, the pixels located at the left edge of each image fall outside the display region. Thus, the pixel groups BL, CL, DL, EL, and FL illustrated in FIG. 5A are added to the right edge of a neighboring image, which is a corresponding one of the images A, B, C, D, and E. FIG. 5B illustrates the result. As illustrated in FIG. 5B, the left-view texture is composed of an image A(L) containing the pixel groups AM, AR, and BL, an image B(L) containing the pixel groups BM, BR, and CL, an image C(L) containing the pixel groups CM, CR, and DL, an image D(L) containing the pixel groups DM, DR, and EL, and an image E(L) containing the pixel groups EM, ER, and FL. For the purpose of convenience in the description, FIG. 5 do not include any figures illustrating the images F and G. Yet, the images F and G are also processed in the same manner.

To create a right-view texture, the images A-E are stitched together and then DIBR is performed. As a result of the image stitching, the pixels located at the right edge of each image fall outside the display region. Thus, the pixel groups GR, AR, BR, CR, DR illustrated in FIG. 5A are added to the left edge of a neighboring image, which is a corresponding one of the images A, B, C, D, and E. FIG. 5C illustrates the result. As illustrated in FIG. 5C, the right-view texture is composed of an image A(R) containing the pixel groups GR, AL, and Am, an image B(R) containing the pixel groups AR, BL, and Bm, an image C(R) containing the pixel groups BR, CL, and Cm, an image D(R) containing the pixel groups CR, DL, and Dm, and an image E(R) containing the pixel groups DR EL, and Em.

FIG. 6A illustrates the texture applied to the inner spherical surface, when the image after the left-shift as illustrated in FIG. 5B is used. FIG. 6B illustrates the texture applied to the inner spherical surface, when the image after the right-shift as illustrated in FIG. 5C is used.

Figure 7A:
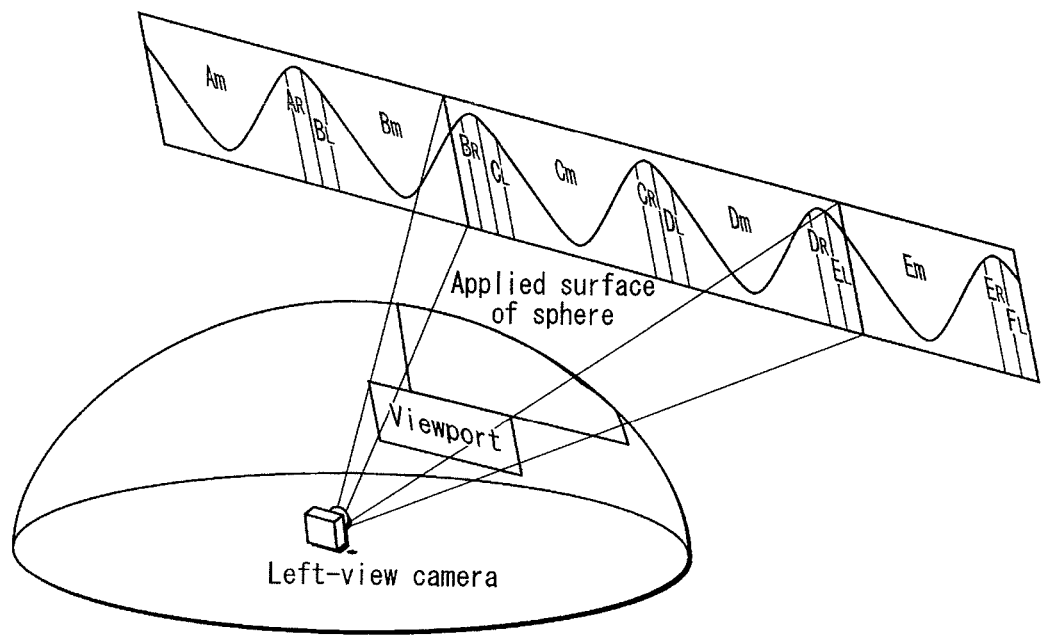
FIGS. 7A and 7B illustrate the left- and right-view texture arrangements, respectively.
Figure 7B:
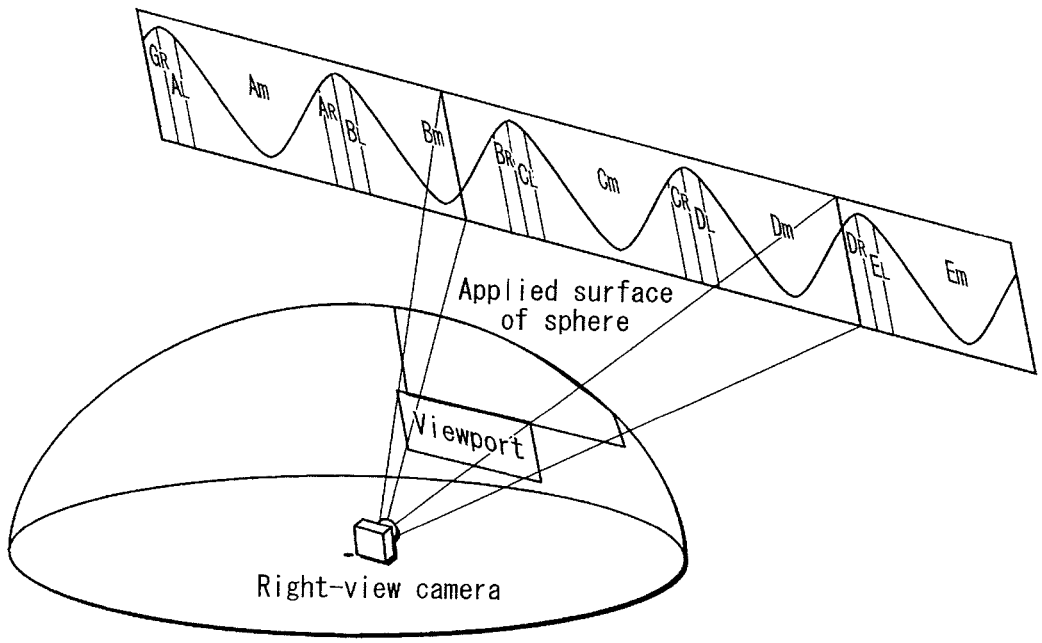

FIG. 7A illustrates the relation between the viewport and the left-view texture or the right-view texture in the three-dimensional modeling space illustrated in FIG. 1. FIG. 7A illustrates the arrangement of the left-view texture. In the figure, the left-view texture is located at a position corresponding to the view vector of the left-view camera and applied to the inner surface of the spherical model. As a result, a portion corresponding to the viewport is used for display. FIG. 7B illustrates the arrangement of the right-view texture. In the figure, the right-view texture is located at a position corresponding to the view vector of the right-view camera and applied to the inner surface of the spherical model. As a result, a portion corresponding to the viewport is used for display.

Figure 8B:
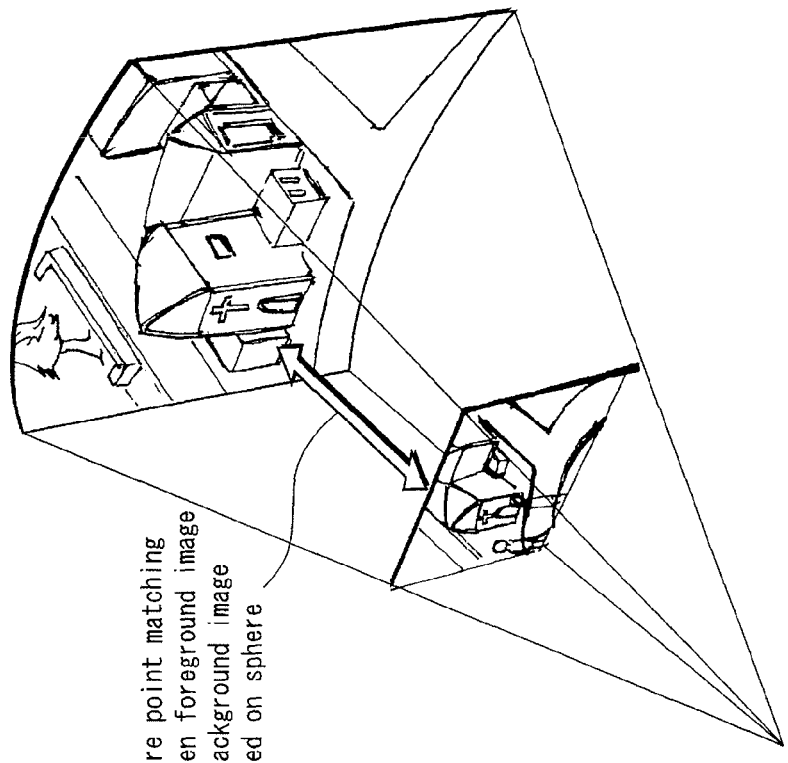
FIGS. 8A and 8B illustrate compositing of a foreground image and a background image.
Figure 8A:
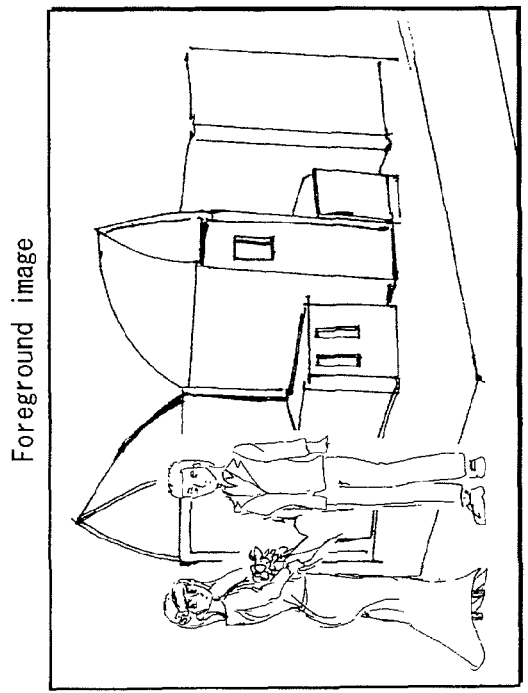

FIGS. 8A and 8B illustrate the composition of a foreground image and a background image. FIG. 8A illustrates the foreground image subjected to the image composition. The foreground image is a snapshot of a bride and groom standing face to face in front of a modern-looking church. Since the modern-looking church is also appears in the background image, the shape defined by the outline of the church is a common feature in both the foreground image and the background image. FIG. 8B illustrates the matching between the foreground image and the background image. By the process of matching, a transformation matrix representing the relation between the background image and the foreground image is obtained. According to the resulting matrix, the depth image for the foreground image is converted prior to DIBR. This ensures that the foreground image is merged into the background image without causing depth disparities.

Figure 9:
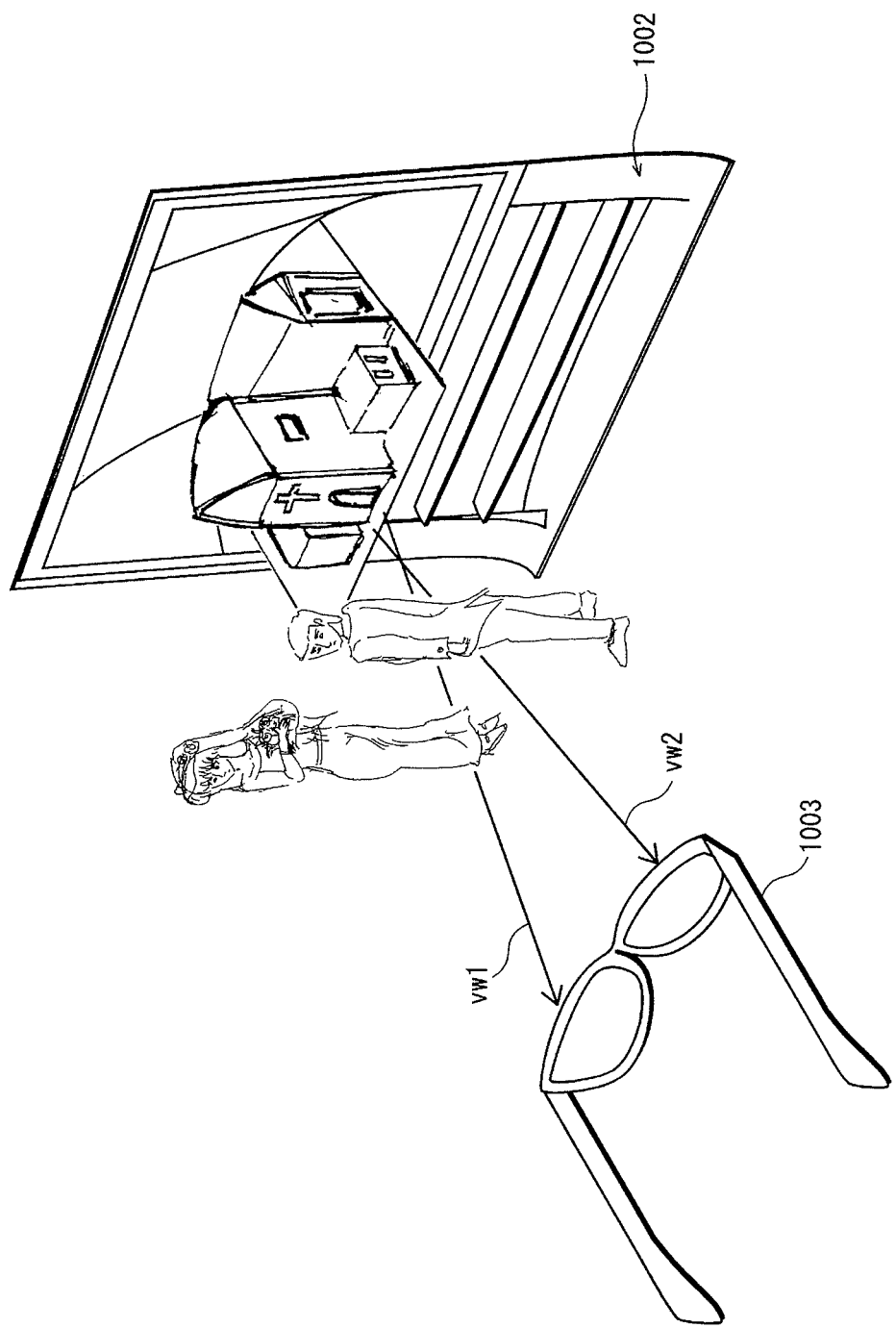
FIG. 9 illustrates one example of a past-experience image.

The image composition illustrated in FIGS. 8A and 8B allows the user to enjoy past experience simulation. FIG. 9 illustrates an example of image composition. A line-of-sight vw1 indicates an image perceived by the user when the eyeglasses 1003 block the right-eye's view. A line-of-sight vw2 indicates an image perceived by the user when the eyeglasses 1003 block the left-eye's view. A left-view image is viewed along the line-of-sight vw1. On the other hand, a right-view image is viewed along the line-of-sight vw2. By wearing the eyeglasses 1003, the user views right-view images and left-view images alternately one by one, so that stereoscopic images are perceived. The image illustrated in FIG. 9 is a stereoscopic image perceived as a result of compositing the foreground image and the background image obtained on the viewports by following the transformation matrix. Since the image of the people appears with the plurality of background images that are appropriately applied on the inner spherical surface, rich and realistic stereoscopic images are perceived. As described above, if a panoramic image of a global location matching that of a photograph is obtained from a server, the photograph is ensured to be composited with a panoramic image appropriately matching the photograph.

Figure 10:
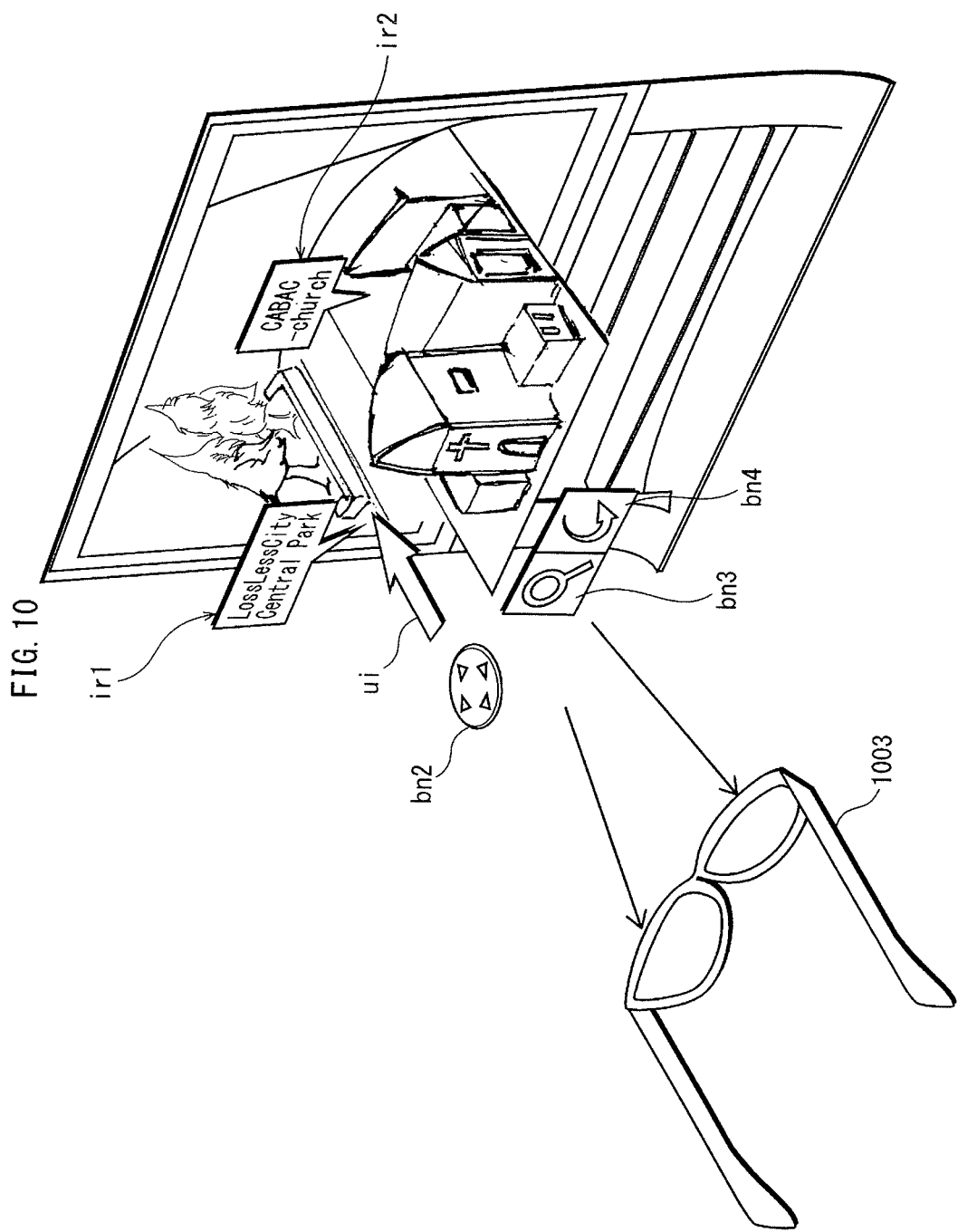
FIG. 10 illustrates one example of a street view navigation screen.

In addition, an UI object may be composited with a street view. FIG. 10 illustrates a street view presented with UI objects. A directional navigator ui is a visual representation of the current line-of-sight direction. Indicators ir1 and ir2 shows the place name (such as, loss-Less City central park) and the building name (such as CABAC church) associated with the location of the current viewpoint. A cross button bn2 is for receiving a user operation of selecting a direction in which the current viewpoint is to be moved. A zoom-up button bn3 is used to receive a user operation of selecting a zoom up or down, without changing the viewpoint and the line-of-sight direction. An angle button bn4 is for receiving a user operation of turning the current direction of the line-of-sight to the right or left. These GUI elements are allocated to keys of a remote control, so that user operations on the remote control enable control on street views, such as moving or rotating the street views. This concludes the description of the global view search service.

(Embodiment 1)

Embodiment 1 is directed to an improvement on a technique of compositing a photograph as a foreground image with a background image. Prior to the description of an image providing device according to Embodiment 1, a description is given of a data flow to be realized by the image providing device according to this embodiment.

Figure 11:
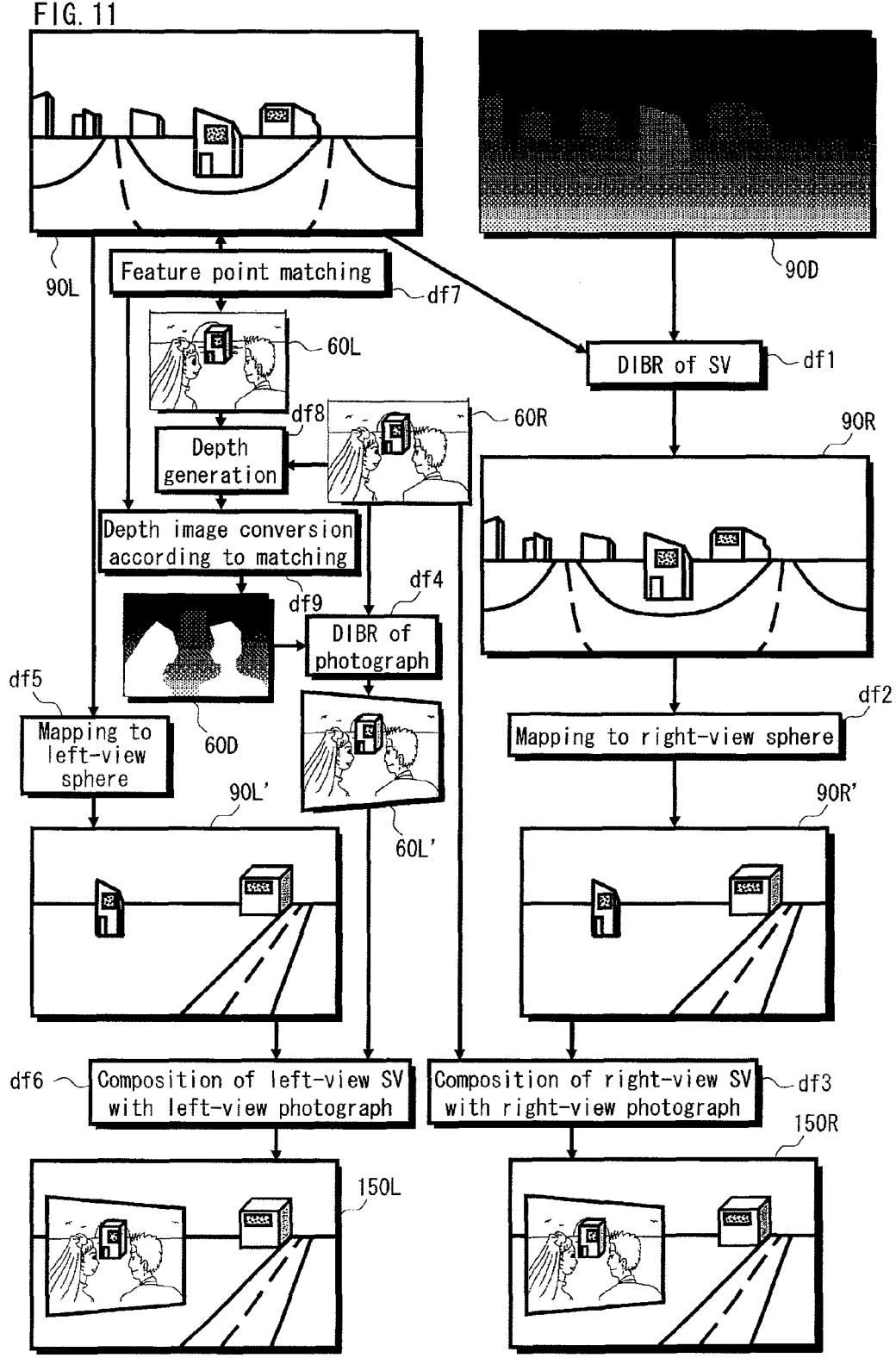
FIG. 11 illustrates an example data flow according to Embodiment 1.

FIG. 11 illustrates an example data flow according to Embodiment 1. The data flow is drawn for images subjected to respective processes along with the details of each process. In the figure, the individual processes in the data flow are denoted by the reference signs df1-df9. One notable feature in the data flow illustrated in FIG. 11 is that a feature point matching process df7 is performed between a panoramic image 90L and photograph data 60L prior to a process of generating a depth image of the photograph. Another notable feature is that a depth conversion process df9 is conducted, based on the matching result, on the depth image obtained by DIBR performed on the photographic images 60R and 60L. The following now describes the data flow of the image providing device, by using the reference signs.

The reference sign df1 with the label "DIBR of SV" denotes a DIBR process of the panoramic image 90C using the depth image 90D. As a result, a second panoramic image 90R is generated.

The reference sign df2 with the label "mapping to right-view sphere" denotes a process of texture mapping of a right-view texture obtained by DIBR, followed by viewport conversion. As a result, a right-view viewport image 90R' is obtained.

The reference sign "df3" with the label "composition of right-view SV and right-view photograph" denotes a process of compositing the right-view image 60R of the photograph with the right-view viewport image 90R' obtained by DIBR. As a result, a composite image 150R is obtained.

The reference sign df4 with the label "DIBR of photograph" denotes a process of performing DIBR on the right-view photograph 60R using the photograph depth image 60D. As a result, a left-view photograph 60L' is obtained.

The reference sign df5 with the label "mapping to left-view sphere" denotes a process of texture mapping of a left-view texture 90L obtained by DIBR. As a result, a left-view viewport image 90L' is obtained.

The reference sign df6 with the label "composition of left-view SV and left-view photograph" denotes a process of compositing the left-view image 60L' of the photograph with the left-view viewport image 90L' obtained by DIBR. As a result, a composite image 150L is obtained.

The following processes df7-df9 are characteristic to this data flow.

The reference sign df7 with the label "feature point matching" denotes a process of matching feature points between the panoramic image 90L and the left-view photograph 60L.

The reference sign df8 with the label "depth generation" denotes a process of generating a depth image for the left-view photograph 60L and the right-view photograph 60R.

The reference sign df9 with the label "depth image generation according to matching" denotes a process of applying conversion to the depth image generated in the depth image generation df8. As a result, a photograph depth image 60D is generated. This concludes the description of the data flow of the image providing device according to Embodiment 1. The following now describes the components of the image providing device for realizing the data flow.

(Internal Configuration of Image Providing Device)

Figure 12:
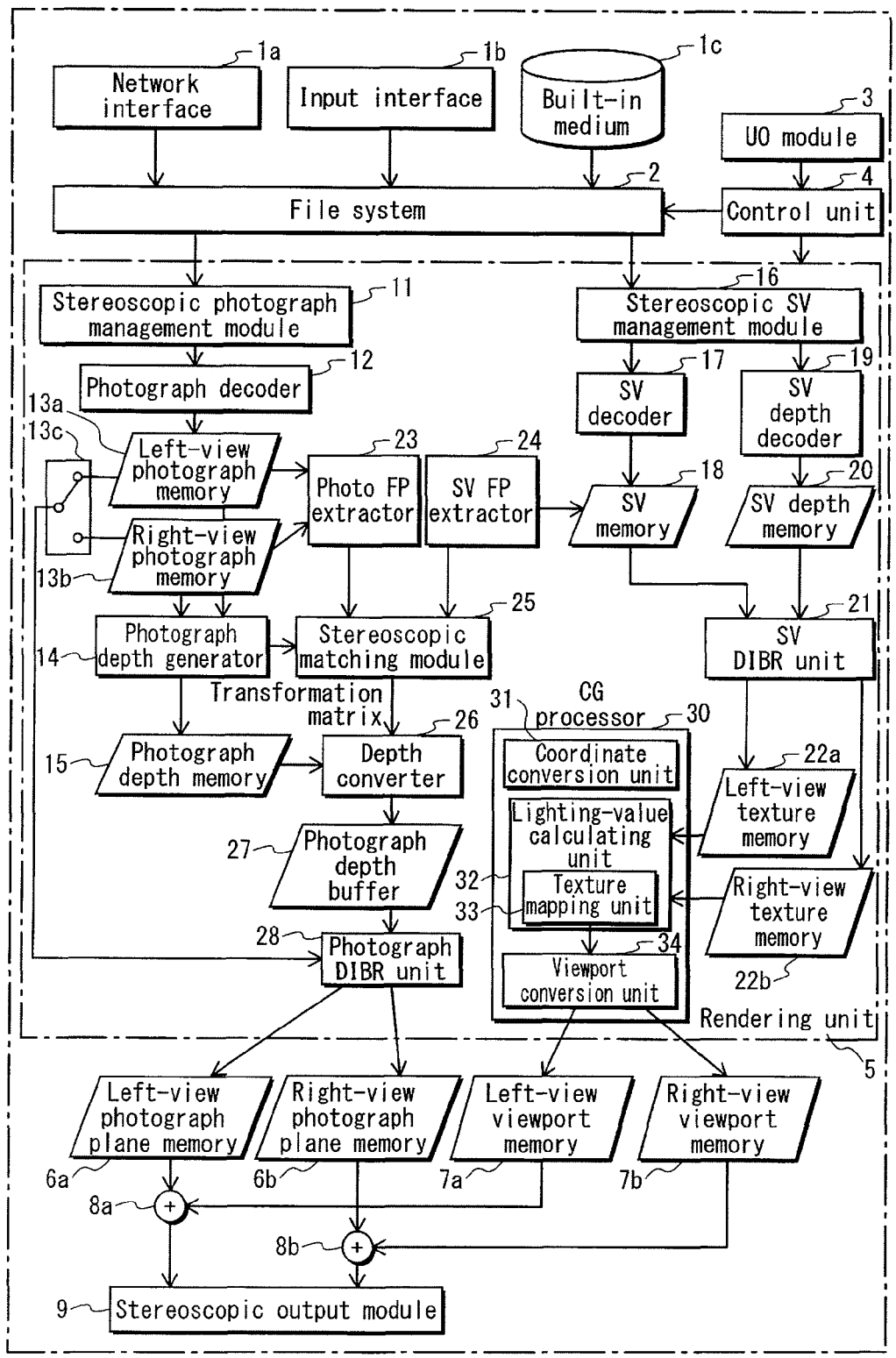
FIG. 12 illustrates the internal configuration of an image providing device according to Embodiment 1.

FIG. 12 illustrates the internal configuration of the image providing device according to Embodiment 1. As illustrated in the figure, the image providing device includes a network interface 1a, an input interface 1b, a built-in medium 1c, a file system 2, a UO module 3, a control unit 4, a rendering unit 5, a left-view photograph plane memory 6a, a right-view photograph plane memory 6b, a left-view viewport memory 7a, a right-view viewport memory 7b, composition units 8a and 8b, and a stereoscopic output module 9. In the figure, a graphic symbol of a dram represents storage, whereas a rhombus represents a memory device.

<Network Interface 1a>

The network interface 1a is for the image providing device to communicate with external sources and capable of accessing a server available on the Internet or a server on a local network. For example, the network interface 1a is used to download past-experience content publicly available on the Internet. The network interface 1a has a request sender and a response receiver. The request sender transmits an image acquisition request specifying, as the current viewpoint, a global location to the global view collection server 1001. Note that the request sender generates such an image acquisition request at the time when a stereoscopic photograph file is read and then transmits the image acquisition request to the global view collection server 1001. To generate the image acquisition request specifying the current viewpoint, the request sender uses the stereoscopic photograph file read via the input interface 1b and also uses geographic information included in the stereoscopic photograph file read from the built-in medium 1c.

The response receiver receives a stereoscopic street view viewpoint file (hereinafter "stereoscopic SV viewpoint file") that is transmitted from the global view collection server 1001 in response to the image acquisition request. The stereoscopic SV viewpoint file transmitted from the global view collection server 1001 has location attributes matching geographic information included in the image acquisition request.

<Input Interface 1b>

The input interface 1b is for a potable external device and a preferable example is a memory card I/F for reading photograph files from a removable medium inserted in a slot, such as an SD card slot. When a removable medium, such as an SD card, is inserted into the slot, the removable medium is electrically connected to the image providing device. Consequently, an electric signal converted from data stored on a semiconductor memory is read via the memory card I/F.

<Built-in Medium 1c>

The built-in medium 1c is, for example, a writable recording medium, such as a hard disk drive or a memory, built in a playback device. The built-in medium 1c stores stereoscopic SV viewpoint files and stereoscopic photograph files.

<File System 2>

The file system 2 controls: communications performed via the network interface 1a; reading and writing performed via the input interface 1b; and writing to the built-in medium 1c. Also, the file system 2 issues a notification upon each insertion and removal of a medium to and from the input interface 1b. Specifically, the file system 2 includes a reader that reads a stereoscopic photograph file via the input interface 1b or from the built-in medium 1c.

<UO Module 3>

The UO module 3 receives a user operation made on GUI. Preferably, the UO module 3 is a module for receiving infrared signals from a remote control.

<Control Unit 4>

Figure 13A:
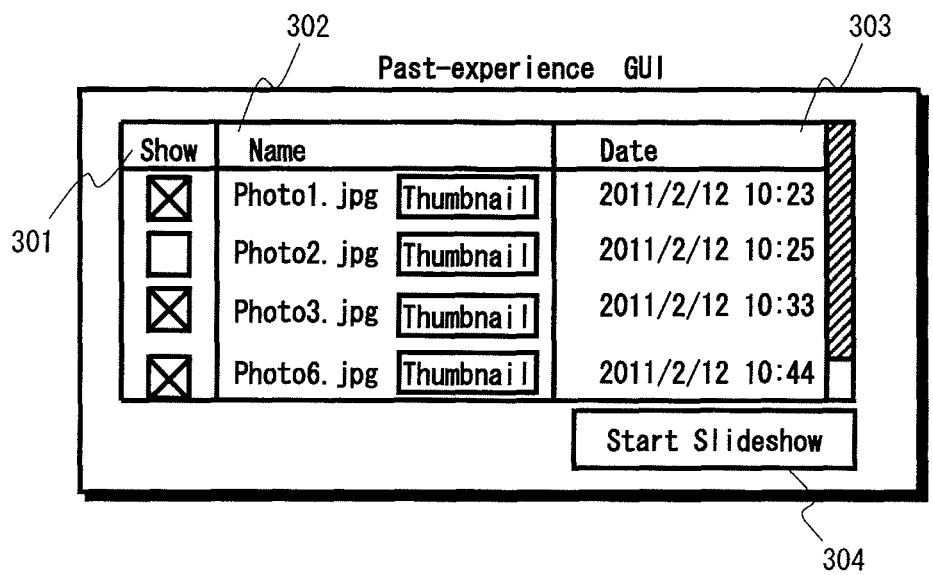
FIG. 13A illustrates one example of a past-experience GUI presented by a control unit 4.

The control unit 4 controls the rendering unit according to user operations made on a GUI screen. A supplemental description of the control performed by the control unit 4 is given from the standpoint of a GUI screen, which is familiar to users. FIG. 13A illustrates a past-experience simulation setting GUI presented under the control by the control unit 4 according to Embodiment 1. The past-experience simulation setting GUI displays a listing 302 of files each with a recording data (Date) 303 and a check box 301. In the figure, a plurality of files including Photo1, mpo, Phto2.mpo, Phto3.mpo, and Photo6.mpo are displayed in the listing along with their thumbnails. Each file is displayed with a corresponding of image capturing date ("2011/2/12 10:22" or "2011/2/12 10:25", for example). If a check box 301 is checked, a corresponding file is used for past-experience simulation. That is, a check box allows the user to select or not to select a corresponding stereoscopic photograph file for a slideshow. Below the GUI, a button 304 is displayed for receiving a user operation of instructing to start a slideshow.

Figure 13B:
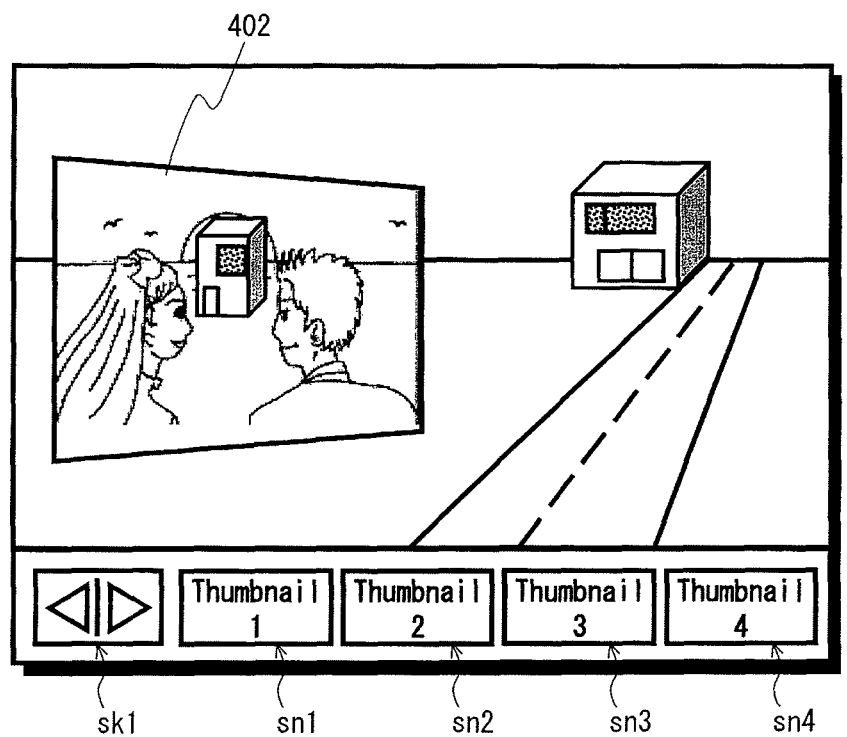
FIG. 13B illustrates one screen display presented in a slideshow.

FIG. 13B illustrates one screen display presented in the slideshow. In the screen display, a photograph 402 is displayed against the background of the panoramic image acquired from the global view collection server. Thumbnails sn1, sn2, sn3, and sn4 illustrated in the figure are a listing of photographs available for display in the past-experience simulation. A skip button sk1 is for receiving a user operation of switching a photograph selected for image composition to a photograph that is displayed before or after the currently selected photograph on the screen. Following user operations made on the GUI screen described above, the control unit 4 controls rendering by the rendering unit 5, so that the control unit 4 provides an interactive operation environment. This concludes the description of the control unit 4.

<Rendering Unit 5>

Under the control of the control unit 4, the rendering unit 5 reads data from the file system 2 and renders images on the photograph plane memories 6a and 6b as well as on the viewport memories 7a and 7b.

<Left-View Photograph Plane Memory 6a>

The left-view photograph memory 6a is for storing left-view photographic images.

<Right-View Photograph Plane Memory 6b>

The right-view photograph memory 6b is for storing right-view photographic images.

<Left-View Viewport Memory 7a>

The left-view viewport memory 7a is for storing left-view viewport images.

<Right-View Viewport Memory 7b>

The right-view viewport memory 7b is for storing right-view viewport images.

<Composition Units 8a and 8b>

The composition unit 8a composites an image stored on the left-view viewport memory with an image stored on the left-view photograph memory, whereas the composition unit 8b composites an image stored on the right-view viewport memory with an image stored on the right-view photograph memory.

<Stereoscopic Output Module 9>

The stereoscopic output module 9 outputs the stored content of the memory resulting from the layer composition by the composition units 8a and 8b to a display device (not illustrated). Preferably, the stereoscopic output module 9 is an HDMI 1.4 transmitter or an HDMI output connector.

This concludes the description of the overall structure of the image providing device. Of the components of the image providing device described above, the rendering unit 5 is the heart of the image providing device and plays a significantly important role in this embodiment. The internal configuration of the rendering unit 5 is described below in more details.

As shown in FIG. 12, the rendering unit includes a stereoscopic photograph management module 11, a photograph decoder 12, photograph memories 13a and 13b, a photograph depth generator 14, a photograph depth memory 15, a stereoscopic SV management module 16, an SV decoder 17, an SV memory 18, an SV depth decoder 19, an SV depth memory 20, an SV DIBR unit 21, texture memories 22a and 22b, a photograph feature-point extractor (in the figure, abbreviated as "photo FP extractor") 23, an SV feature-point extractor (in the figure, abbreviated as "SV FP extractor") 24, a stereoscopic matching module 25, a depth converter 26, a photograph depth buffer 27 a photograph DIBR unit 28, and a CG processor 30 (which in turn includes a vertex processing unit 31, a rendering processing unit 32, a texture mapping unit 33, and a pixel processing unit 34).

<Stereoscopic Photograph Management Module 11>

The stereoscopic photograph management module 11 reads a stereoscopic photograph file from the file system 2 and analyzes the read stereoscopic photograph file.

<Photograph Decoder 12>

The photograph decoder 12 is a JPEG decoder and expands a compressed left-view image 504 and a compressed right-view image 505 contained in a stereoscopic photograph file. A supplemental description of the processes performed by the photograph decoder 12 is given from a standpoint of the data structure to be processed. Photograph data subjected to decoding is for stereoscopic viewing and stored in an MPO format file. An MPO (Multi picture object) format file is for images that can be captured by specific digital cameras and stores two JPEG files. Examples of the specific digital cameras include 3DS manufactured by Nintendo Co., Ltd and FinePix REAL 3D W1 and W3 cameras manufactured by Fujifilm Corporation. FIG. 14A illustrates the data structure of a stereoscopic photograph file. More specifically, FIG. 14A illustrates the data structure and example data of a stereoscopic photograph file 501 according to Embodiment 1. The stereoscopic photograph file includes the following data: a date 502 of image capturing; a size 503; the compressed left-view image 504; and the compressed right-view image 505. The stereoscopic photograph file also includes data relating the geographic information of the image-capturing location including the latitude 506, longitude 507, altitude 508, direction 509, and inclination angle 510. The date 502 indicates the date of the image capturing. The size 503 indicates the horizontal and vertical size of the image. The compressed left-view image 504 is data compressed in the JPEG format. The compressed right-view image 505 is data compressed in the JPEG format. The latitude 506, longitude 507, and altitude 508 are geographic information specifying the location of the image capturing. The direction 509 and the inclination angle 510 indicate the direction in which the image was captured. A stereoscopic camera used for image capturing has two lenses. The left lens is for capturing an example left-view image 6L, whereas the right lens is for capturing an example right-view image 6R. The stereoscopic camera compresses the left- and right-view images and stores the compressed images into a stereoscopic photograph file with additional information. As illustrated in the figure, the latitude, longitude, altitude and direction allows the image capturing location to be specified, so that an appropriate panoramic image is used as the background image for matching. FIG. 14B illustrates the left- and right-view image data compressed in the JPEG format. Data subjected to decoding by the photograph decoder 12 is ensured to be stereoscopic photograph files which are available for accurate matching. This concludes the description of the photograph decoder 12.

<Left-View Photograph Memory 13a and Right-View Photograph Memory 13b>

The right-view photograph memory 13a and the left-view photograph memory 13b respectively store right- and left-view images developed by the photograph decoder 12.

<Switch 13c>

The switch 13c outputs a base image selected from images stored in the photograph memories 13a and 13b to the photograph DIBR processing unit 28.

<Photograph Depth Generator 14>

The photograph depth generator 14 analyzes the left-view image and the right-view image developed by the photograph decoder 12 to generate a depth image. FIG. 14C shows a depth image generated from the left-view image 60L and the right-view image 60R that are illustrated in FIG. 14B. The depths of objects appearing in the image are represented by pixel intensity. A brighter pixel indicates a shorter distance to an object surface. Black pixel indicates a distance longer than a threshold, whereas a white pixel indicates a distance shorter than the threshold.

<Photograph Depth Memory 15>

The photograph depth memory 15 stores depth images generated by the photograph depth generator 14.

<Stereoscopic SV Management Module 16>

The stereoscopic SV management module 16 reads a stereoscopic SV viewpoint file from the file system 2 and analyzes the read file.

<SV Decoder 17>

The SV decoder 17 is a JPEG decoder and develops a compressed Mercator image 802 stored in a stereoscopic SV viewpoint file and stores resulting uncompressed panoramic image data to the SV memory 19. A stereoscopic SV viewpoint file is for reproducing views from a viewpoint at a desired global location and stores a compressed Mercator image of a full panoramic view and a compressed Mercator depth image of the Mercator image, along with the location attributes associated with the viewpoint. In this example, the location attributes include the latitude, longitude, altitude, direction, and inclination angle. A supplemental description of the SV decoder 17 is given from a standpoint of the data structure to be processed. FIG. 15 illustrates the data structure and example data of a stereoscopic SV viewpoint file according to Embodiment 1. In FIG. 15, the compressed Mercator image stored in the stereoscopic SV viewpoint file is obtained by JPEG compression a Mercator projection image of a panoramic image. Thus, by decoding the compressed Mercator image, a panoramic image is obtained. FIG. 15A illustrates the data structure of the stereoscopic SV viewpoint file. A stereoscopic SV viewpoint file has a common data structure with a stereoscopic photograph file. Therefore, a stereoscopic SV viewpoint file optimally matching a given photograph is retrieved quickly, by searching the database for a stereoscopic SV viewpoint file having the location attributes matching the latitude, longitude, and altitude of the given photograph. A panoramic image retrieved through the search in the above manner is stored in a stereoscopic SV viewpoint file and subjected to decoding by the SV decoder 17. FIG. 15B illustrates an example of a compressed Mercator depth image 802 stored in a stereoscopic SV viewpoint file 801 according to Embodiment 1. The panoramic image 90C is generated by image capturing from all the directions and projecting the captured image by the Mercator projection. As described above, panoramic images (Mercator images) are stored in stereoscopic SV viewpoint files and processed in units of street views. Therefore, in the present disclosure, a panoramic image (Mercator images) is referred to as a street view (SV). This concludes the description of the SV decoder 17.

<SV Memory 18>

The SV memory 18 stores panoramic images 511 developed by the SV decoder 17.

<SV Decoder 19>

The SV depth decoder 19 is a PNG decoder. The SV depth decoder 19 develops a compressed Mercator depth image 803 stored in a stereoscopic SV viewpoint file 801 and stores the resulting uncompressed data to the SV depth memory 20. FIG. 15C shows an example depth image 90D. The depth image 90D indicates depths to the surfaces of objects appearing in the panoramic image 90C. The depths of objects appearing in the image are represented by pixel intensity. A brighter pixel indicates a shorter distance to an object surface. A black pixel indicates infinity, and a white pixel indicates the location where the image was captured (i.e., distance zero).

<SV Depth Memory 20>

The SV depth memory 20 stores uncompressed depth images obtained as a result of decoding by the SV depth decoder 19.

<Street View DIBR Processing Unit 21>

The street view DIBR processing unit 21 performs DIBR of the panoramic image on the basis of a depth image to generate a panoramic image seen from another viewpoint. A DIBR (Depth Image Based Rendering or Depth Image Based Representations) refers to a process of shifting pixels of the base image to the right or left with reference to the depth image (depth map) thereby to generate an image seen from another viewpoint. When a left-view image is used as the base panoramic image, pixels shifted to the right in a parallax image (i.e. right-view image) appear farther back in the 3D space. Conversely, pixels shifted to the left in the parallax image appear closer toward the front in the 3D space. These stereoscopic effects are optical illusions resulting from the difference in the angle of convergence between the human eyes. By shifting pixels in the right-view image to the left with respect to the left-view image which is used as the base, the angle of convergence decreases, yielding a so-called cross-eyed image. The object represented by these pixels is thus perceived as being positioned closer. Conversely, by shifting pixels in the right-view image to the right with respect to the base left-view image, the angle of convergence increases. The object represented by these pixels is thus perceived as being positioned farther back. As described above, by shifting pixels of the base left-view image to the right or left according to the depth values of corresponding pixels shown in the depth image, a right-view image making up a stereo pair with the left-view image is generated.

<Left-View Texture Memory 22a and Right-View Texture Memory 22b>

The right-view texture memory 22a and the left-view texture memory 22b respectively store left- and right-view textures obtained as a result of DIBR performed by the street view DIBR processing unit 21.

<Photograph Feature-Point Extractor 23>

The photograph feature-point extractor 23 extracts feature points from photograph data stored in the left-view photograph memory 13a and the right-view photograph memory 13b to generate a feature point descriptor 701.

<SV Feature-Point Extractor 24>

Similarly to the photograph feature-point extractor 23, the SV feature-point extractor 24 extracts feature points from a panoramic image, excludes feature points using a depth search range relative to the depth image, and performs matching between the panoramic image data and the photograph data using the feature points remaining without being excluded. From the matching result, a transformation matrix representing the three-dimensional relation between the stereoscopic photograph and the panoramic image data is defined.

<Stereoscopic Matching Module 25>

The stereoscopic matching module 25 performs matching between the feature point descriptor 701 generated by the photograph feature-point extractor 23 and the feature point descriptor 701 generated by the SV feature-point extractor 24 to obtain a transformation matrix representing the relative positions in a three-dimensional space between the stereoscopic photograph and the panoramic image of a street view.

<Depth Converter 26>

The depth converter 26 converts the photograph depths stored in the photograph depth memory 15, using the transformation matrix obtained by the stereoscopic matching module 25, and stores the photograph depths resulting from the conversion into the photograph depth buffer 27.

<Photograph Depth Buffer 27>

The photograph depth buffer 27 stores photograph depths converted by the depth converter 26.

<Photograph DIBR Processing Unit 28>

The photograph DIBR processing unit 28 performs DIBR on the photograph (base image) selected by the switch 13c from among photographs stored in the photograph memories 13a and 13b and by using the associated photograph depth image. The left-view photograph data and the right-view photograph data resulting from the processing are written into the left-view photograph plane memory 6a and the right-view photograph plane memory 6b, respectively.

<CG Processor 30>

The CG processor 30 places the three-dimensional coordinates describing modeling data to their corresponding coordinates in the three-dimensional modeling space and projects the three-dimensional coordinates in the three-dimensional modeling space to the viewport. The processing by the CG processor 30 involves coordinate and field-of-view conversion, lighting value calculation (texture mapping process), and viewport processing.

<Coordinate Conversion Unit 31>

The coordinate conversion unit 31 specifies the camera direction and zoom level for determining a screen for projecting three-dimensional objects as seen from the camera as the viewpoint. Thereafter, coordinate conversion is performed to convert the three-dimensional coordinates describing the modeling data on the spherical model to world coordinates in the three-dimensional modeling space. The coordinate conversion is to convert the three-dimensional coordinates describing the model data to the coordinates in the world coordinate system with the camera position in the three-dimensional modeling space as its origin and thus to obtain a view as seen from the camera position.

<Lighting-Value Calculating Unit 32>

The lighting-value calculating unit 32 calculates lighting values at each vertex of a three-dimensional object as a result of ray casting from a light source position set in the three-dimensional modeling space.

<Texture Mapping Unit 33>

The texture mapping unit 33 prepares two spheres, one for the left-view and the other for the right-view, in the three-dimensional modeling space. The texture mapping unit 33 maps two or more left-view texture images and two or more right-view texture images, which are obtained by converting a background image, to the inner surface of a corresponding one of the left-view spherical model and the right-view spherical model.

<Viewport Conversion Unit 34>

The viewport conversion unit 34 performs coordinate conversion according to display information that includes information about the display resolutions and so on, so that the coordinates describing vertex positions in the three-dimensional modeling space are converted to two-dimensional screen coordinates. In this way, the viewport conversion unit 34 extracts viewport images. The images extracted include a left-view viewport image and a right-view viewport image. The viewport conversion unit outputs the extracted images to a corresponding one of the left-view plane memory 6 and the right-view plane memory 7. An instruction given by the position and direction determining unit 2 to the rendering control unit 5 may be for changing the current line-of-sight direction without changing the current viewpoint. In that case, the texture mapping unit skips the texture mapping process, whereas the viewport conversion unit operates to re-do the process of extracting viewport images in order to reflect the change in the line-of-sight direction and outputs the results to the plane memories.

Up to this point, the internal configuration of the image providing device has been described, and this concludes the description of the internal configuration of the image providing device. Among the components of the illustrated internal configuration, the photograph feature-point extractor 23, the SV feature-point extractor 24, and the stereoscopic matching module 25 are components newly created for the present patent application, and the solution to the technical problem mentioned above resides in these components. The components other than these new components are generally known and merely necessary for providing the functionality of an existing digital home appliance. The following is a detailed description of the newly created components (the photograph feature-point extractor 23, the SV feature-point extractor 24, and the stereoscopic matching module 25). The following detailed description is given by way of an example related to specific images.

<Feature Points Used in Matching>

The following describes feature points to be extracted by the photograph feature-point extractor 23 and the SV feature-point extractor 24.

In the case where a stereoscopic photograph and a panoramic image that are subjected to image matching are captured at significantly different times, the image matching is performed using features expected to be invariant over a time. Pixels constituting a feature point show variations in intensity. Whether or not to use a feature point in the subsequent image matching is determined depending on whether or not the median of the distribution of intensity values falls within a predetermined permissible range (depth search range). Any feature point whose median intensity falling outside the range should be excluded from the subsequent matching. For example, a pixel at infinity in a background image has an intensity value close to 0. Thus, a feature point that includes such a pixel having an intensity value close to 0 is expected to have a median intensity falling outside the depth search range and thus excluded from the feature point calculation. This arrangement serves to improve the matching accuracy.

Generally, a feature point in a stereoscopic photograph appearing too close is often part of a person or the like, which is the subject of the stereoscopic photograph. On the other hand, a feature point which appears too far is often of the sky or the like. Thus, by exclusively using feature points appearing not too far and not too close, i.e., feature points whose median of pixel intensity distribution falls within the depth search range, accuracy in the feature matching is ensured.

In the example of the photograph depth image 60D, people appearing too close and the sky appearing too far have been excluded. Thus, the buildings and the ground are subjected to the subsequent matching and thus the matching is performed with accuracy.

A facial recognition technique may be applicable here. For example, face recognition may be carried out and then feature points found on the recognized face are used to determine the range, so that any feature points appearing closer than the face are regarded as falling outside of the range. With the above arrangement, feature points appearing near the face are excluded from the subsequent matching, which serves to improve the accuracy. Note that the comparison is made using the central pixel of a feature point in the interest of the computing power.

Feature extraction is computationally expensive. Therefore, by subjecting only either of the left-view image and the right-view image to the feature extraction, the overall processing time is shortened, and thus a response time taken before outputting an image to the user is also shortened. Also, for a stereoscopic photograph taken from the left side, the right-view image in a stereo pair is closest to the image seen from the stereoscopic SV viewpoint. Therefore, the right-view image is designated as a base image for feature extraction and depth generation, which leads to improved accuracy. In addition, decoding the base image first allows the hardware resources involved in decoding to be used for decoding the other image during the time of the feature extraction of the decoded base image. With this parallel processing, processing speed is expected to improve even further.

The accuracy may be improved further by leveling a depth image with the use of a leveling formula devised in consideration of the radius of the feature point. The leveling formula modifies the pixel intensity distribution of a feature point based on the distance of each pixel to the center of the entire area occupied by the feature point. By determining the depth search range based on the depth image having been leveled in the above manner, feature points suitable for matching are duly selected. This concludes the description of feature points used for matching. The following now describes feature point descriptors in detail.

<Feature Point Descriptor>

The following describes feature point descriptors obtained as a result of extraction by the photograph feature-point extractor 23 and the SV feature-point extractor 24.

Figures 16A, 16B:
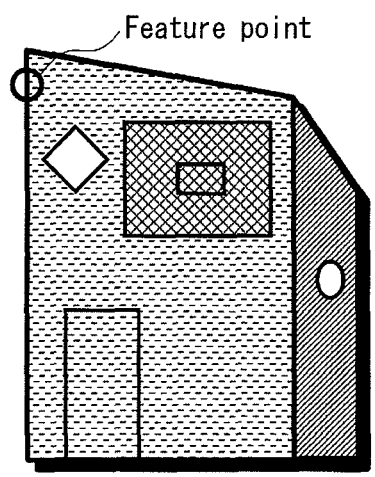
FIG. 16A illustrates a building appearing in a depth image.
FIG. 16B illustrates the data structure and example data of a feature point descriptor 201.

FIG. 16A illustrates on an enlarged scale a house appearing in the depth image. In the figure, the front and side well as the window of the house differ in intensity, and a different hatch pattern is used to represent the different intensity. A feature point is extracted from a portion of the depth image showing a large intensity change. In this example, a feature point is extracted from a portion corresponding to the outline of the house. Each circle in the figure represents a group of pixels extracted as a feature point. The result of feature point extraction is described by a feature point descriptor. FIG. 16B illustrates the data structure and example data of the stereoscopic photograph file 701 according to Embodiment 1. The feature point descriptor 701 relevant to a feature point includes the following data pieces: a center 702; a radius 703; a direction 704; and a feature value 705. The center 702 indicates the relative center of the relevant feature point in the image. The radius 703 indicates the relative radius of the relevant feature point in the image. The direction 704 indicates the direction of the spectral distribution of the relevant feature point in the image. The feature value 705 indicates the value of the relevant feature point. Searching a plurality of images for a specific feature value allows similar images to be specified.

This concludes the detailed description the feature point extracting process to be implemented as the photograph feature-point extractor 23 and the SV feature-point extractor 24. Next, the details of process to be implemented as the stereoscopic matching module 25 will be described.

The following describes how the stereoscopic matching module 25 makes matching between a photograph and a background image. The following description is directed to an example in which Background image A and Photograph B shown in FIG. 17 are used. FIG. 17 shows, as one example, the photograph and the background image that are subjected to feature matching. The background image A and the photograph B shown in the figure were taken in front of the Arc de Triomphe in Paris. Although the background image A and the photograph B were taken at different times and days, the same shop buildings appear in both. Since the same buildings appear in both the background image A and the photograph B, the photograph B is distorted to match the background image A, by applying conversion involving rotation and translation. The rotation and translation are made by relating corresponding feature points in the background image A and the photograph B.

Figure 18A:
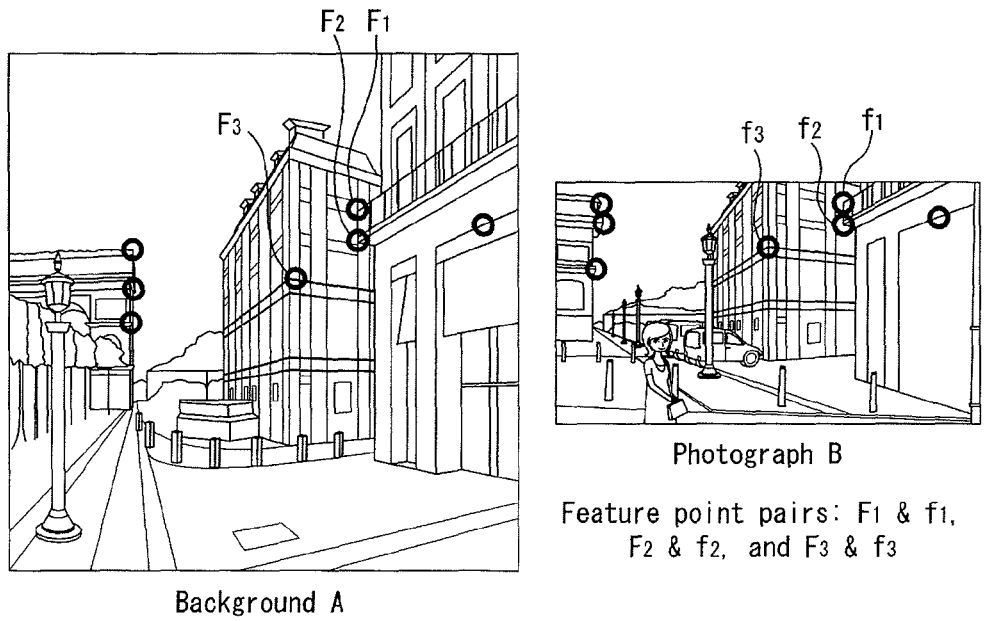
FIG. 18A illustrates example feature points.

A feature point appears as a group of pixels together defining a circular shape. FIG. 18A illustrates example feature points. Among the feature points appearing in the background image A and the photograph B, the following pairs of feature points are regarded to have a high degree of similarity: a feature point F1 in the background image A with a feature point f1 in the photograph B; a feature point F2 in the background image A with a feature point f2 in the photograph B; and a feature point F3 in the background image A with a feature point f3 in the photograph B. In the above manner, pairs of corresponding feature points in the background image A and the photograph B are identified. After finding feature points in the photograph and the image using an existing algorithm, feature point pairs are identified by the method of least squares. Then, a matrix H for distorting the photograph B into a rectangle C is obtained.

Figure 18B:
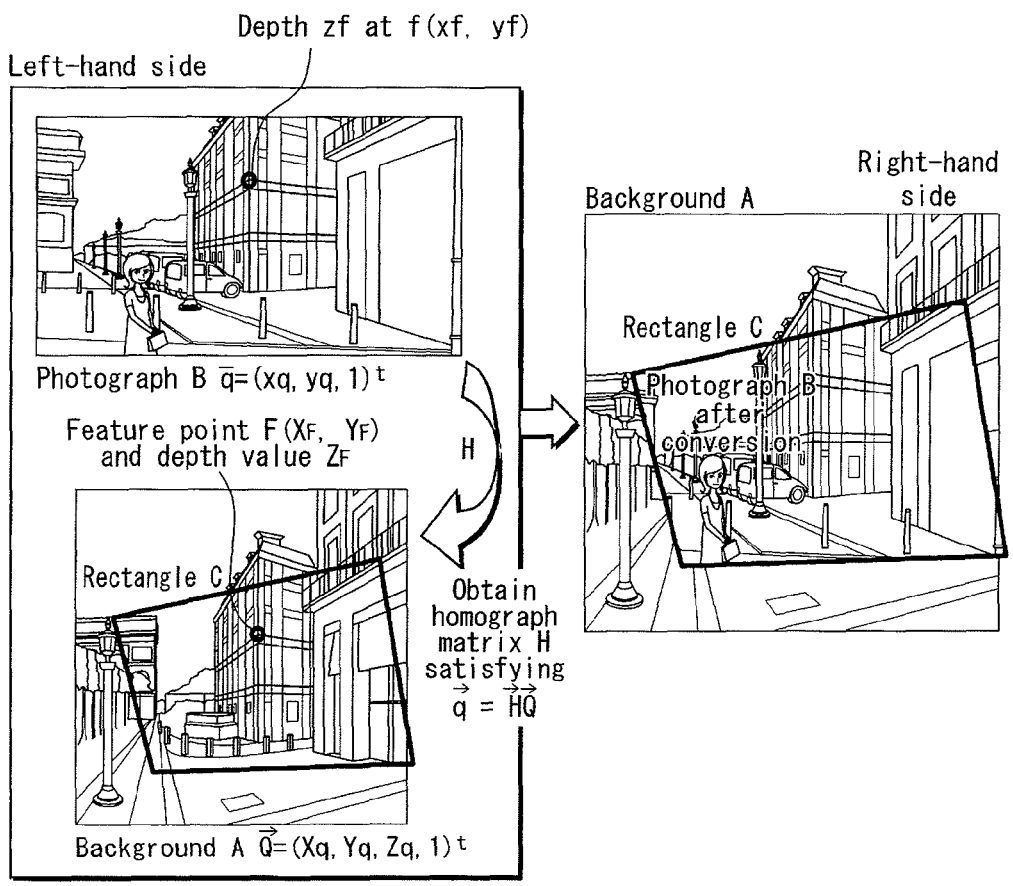
FIG. 18B illustrates the process and result of distortion to combine Photograph B onto Background image A.

FIG. 18B illustrates the process and result of conversion by the stereoscopic matching module 25 to merge the photograph B into the background image A. The left-side of FIG. 18B illustrates the process of conversion. The rectangle box C in the background image A illustrated below the photograph B indicates the reference position and shape into which the photograph B needs to be distorted to be fitted into the background image A. As shown in the figure, the photograph B is merged into the background image A by fitting the photograph B into the shape of the rectangle box C. As long as three or more pairs of corresponding feature points are identified, a matrix enabling the rotation and translation as described above, namely, a homography matrix H, is found.

The right-hand side of FIG. 18B shows the image resulting from applying the photograph B after the above conversion.

Note that the photograph B is projected by the homography matrix H onto the plane bounded by the rectangle C.

Then, a depth map Mf of the photograph B is subjected to projection by the homography matrix H, thereby to obtain Mf'. In this way, the depths of the photograph B projected onto the background image A are obtained by calculation.

The following describes a homography matrix. Suppose that a point Q(X, Y, Z) on one plane in the three-dimensional modeling space is projected to another plane and that the coordinates of the projected point are q(x, y). Then, the points q and Q satisfy the relation given by Formula 2 below.

$$\vec{Q} = \begin{bmatrix} X \\ Y \\ Z \\ 1 \end{bmatrix}$$

$$\vec{q} = \begin{bmatrix} x \\ y \\ 1 \end{bmatrix}$$

$$\vec{q} = s H \vec{Q}$$

[Formula 2]

In this formula, "s" denotes the scale factor and "H" denotes a homography matrix. The following is a description of a homography matrix. A homography matrix is composed of two elements, one is "rotation and translation" and the other is "projection conversion".

Here, let "W=[Rt]" denote a matrix having an element of rotation and translation, and M (internal matrix of the camera) denote a matrix having an element of projection conversion, then Formula 3 below is true.

$$W = [Rt]$$

$$M = \begin{bmatrix} f_x & 0 & C_x \\ 0 & f_y & C_y \\ 0 & 0 & 1 \end{bmatrix}$$

$$\vec{q} = s M W \vec{Q}$$

[Formula 3]

For a street view, the depth Tf of a corresponding pixel in the depth image is used as the Z coordinate of the post-matching feature point. By substituting Tf as the Z coordinate in Formula 1 shown in the "Solution to Problem" section of the present disclosure, a matrix H satisfying these Formulas is derived.

More specifically, the matrix H is given by Formula 1 by using a specific feature point f(xf, yf) on the photograph B, a feature point F(XF, YF) corresponding on the background image A to the feature point f, and a depth value ZF. One of the references provided by OpenCV, cvFindHomography( ) may be used to generate a transformation matrix. Function cvFindHomography obtains a projection transformation H=||hij|| between two images. The format of the API call is as follows.
    void cvFindHomography(const CvMat* src#points,
const CvMat∝dst#points,
CvMat∝homography);

The first argument "src#points" indicates the coordinates of a point on a first image. The second argument "dst#points" indicates the coordinates of a point on a second image. Finally, "homography" is a 3×3 homography matrix (planar projection transformation matrix) that is output as a return value. This concludes the description of a transformation matrix. The following describes the details of a depth image.

Each pixel in a depth image is usually expressed in 8 bits and assigned a value ranging from 0 (farthest) to 255 (nearest). Feature points subjected to matching are limited to those having, at its center, a pixel remaining after excluding any pixels falling above the upper limit, below the lower limit, or outside of the range between the upper and the lower limit. When both the upper limit and the lower limit are used, any feature point having a central pixel with the depth 0 or 255 is excluded. Therefore, feature points having a central pixel with the depth falling within the range of 1 to 254 is determined as feature points within the matching range. This improves the matching accuracy.

Figure 19A:
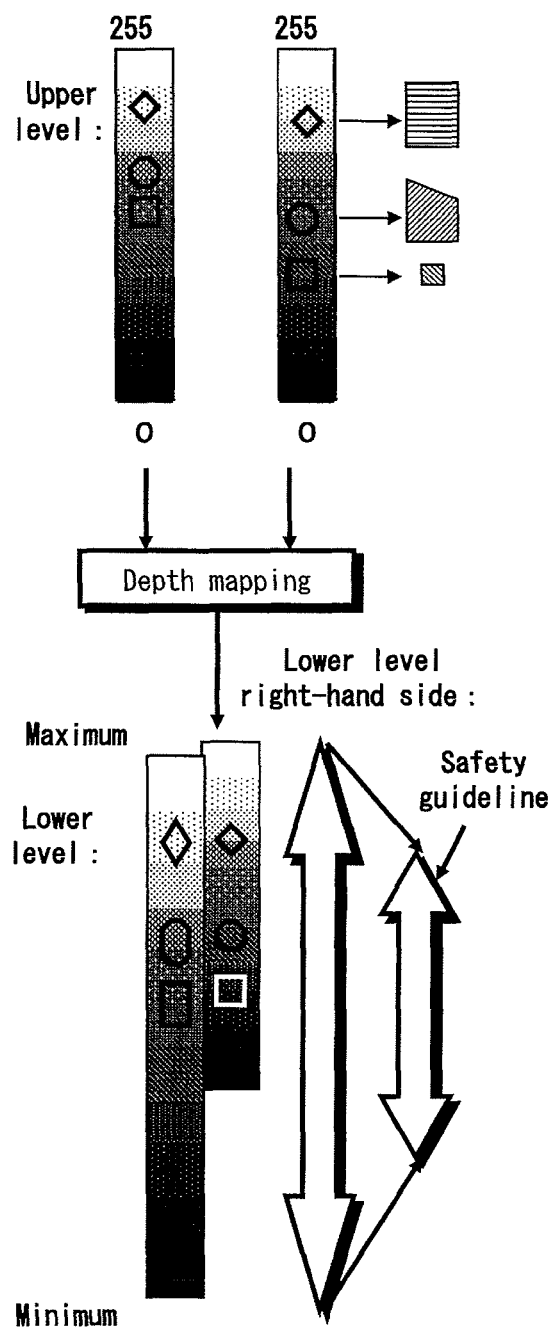
FIG. 19A illustrates a depth image of a foreground image and a depth image of a background image.
Figure 19B:
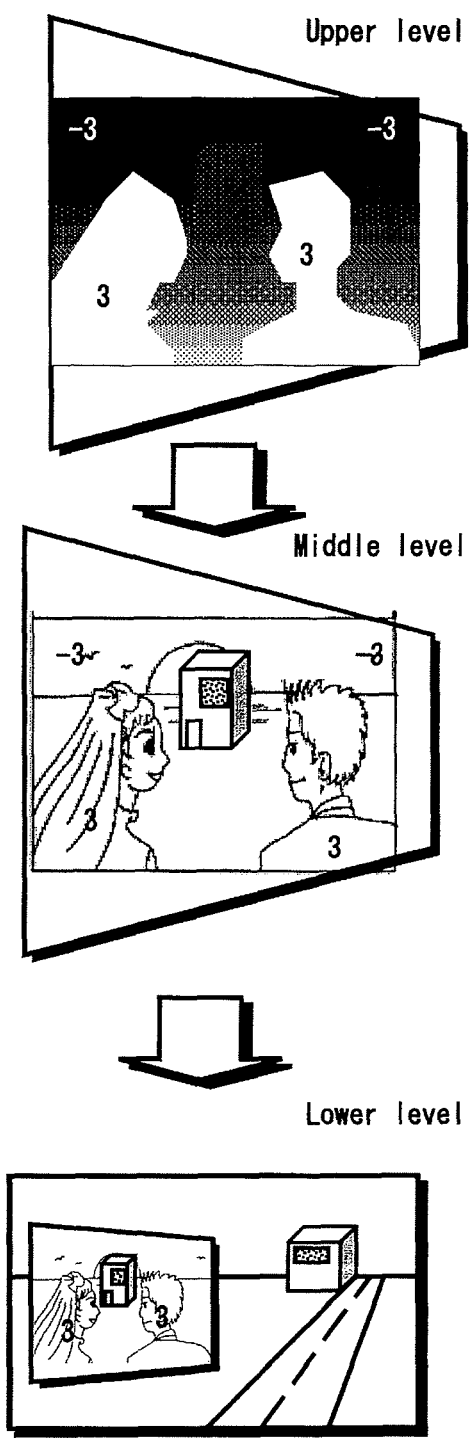
FIG. 19B illustrates the process of rendering the background image and the foreground image performed in view of the matching result.

The following describes how the depth image mapping is carried out through the process by the stereoscopic matching module 25. FIGS. 19A and 19B schematically illustrate the mapping of a depth image. The depth image of the photograph is expressed by 8-bit values ranging from 0 to 255. An SV depth is expressed in 8-bit value within the range of 0 to 255. Based on the depths of feature points used in the matching, the depths of the entire image are mapped. This arrangement is to suppress the shift amount of pixels to be made in DIBR.

FIG. 19A illustrates the depth image of photograph data (i.e., a foreground image) and the depth image of a panoramic image (i.e., a background image). These two depth images are subjected to mapping. The hatch patterns in the figure represent depth ranges. Among the above ranges, the ranges marked with a rhombus, a circle, and a rectangle correspond to the ranges of depths to the respective buildings. The foreground image and the background image show different depth ranges with respect to the same buildings. After the transformation of the depth image of the foreground image by the homography matrix mentioned above, the mapping result shown in the bottom of FIG. 19A is obtained. That is, the range marked with a rhombus becomes substantially the same between the background image and the foreground image. Similarly, the range marked with a circle becomes substantially the same between the background image and the foreground image, and the range marked with a rectangle becomes substantially the same between the foreground image and the background image. Through the transformation based on the above matching result, the range of intensity of a building appearing in the background image is made substantially equal to the range of intensity of a corresponding building appearing in the foreground image. This ensures the background image and the foreground image to be composited without giving an unnatural appearance.

Shown on the right-hand side at the bottom of FIG. 19A is a safety guideline range. The safety guideline range is defined as the intermediate portion remaining after excluding portions beyond the upper and the lower limit is the depth range. By adjustments based on the safety guideline range, the depth range marked with the rhombus and upper as well as the depth range marked with the rectangle and lower are excluded.

FIG. 19B illustrates the process of rendering the background image and the foreground image performed in consideration of the matching result. The upper level of the figure shows the photograph depth image, and people appearing therein are represented by pixels having an intensity value 3. The middle level of the figure shows the photograph showing depths to people and also to the background surfaces. Here, the depth to the people appearing in the photograph is at scale 3, the depth to the building is at scale 2, and the depth to the sky is at scale −3. Based on the depth range mapping described above, portions corresponding to sales 0 to −3 are excluded, so that portions corresponding to scales from +3 to 0 are regarded as valid depths of a street view. Note that feature points corresponding to people appearing in the photograph at the depth scale +3 are not used in matching with the street view, because street views do not contain objects (people) appearing at such a depth. On the other hand, street views may contain a background object appearing at the depth scale −3. However, portions of the photograph having such a depth are excluded by conversion and thus not used in feature point matching with the street view. Street views may contain objects (buildings) appearing at the depth scale 2. Therefore, homography transform is applied to translate, rotate, and scale the buildings appearing in the photograph to mach corresponding buildings appearing in the background image.

By obtaining the transformation matrix representing the transformation to convert the photograph depth image, followed by DIBR of the photograph, the composite image as shown on the lower level of FIG. 19B is obtained.

Since the DIBR is performed after projecting the depth image of a photograph to the depth image of a panoramic image, any extreme amount of shift of pixels is not required. This ensures to avoid generating stereoscopic images that are uncomfortable to view. In addition, since no computation of a 3D coordinate system is involved, this technique holds promise for improving the processing speed and saving hardware resources.

<Software Implementation by Operation on CPU>

The image providing device according to this embodiment can be industrially manufactured by implementing the components of the image providing device with hardware integrated components, such as ASIC. The architecture of a general-purpose computer system, such as a CPU, code ROM, and RAM, may be employed for the hardware integrated component. In that case, it is necessary to write a program in computer code for realizing the processing steps carried out by the respective components of the image processing device and store the program on code ROM in advance. Then, the processing steps described in the program need to be executed by the CPU included in the hardware integrated component.

Figure 20:
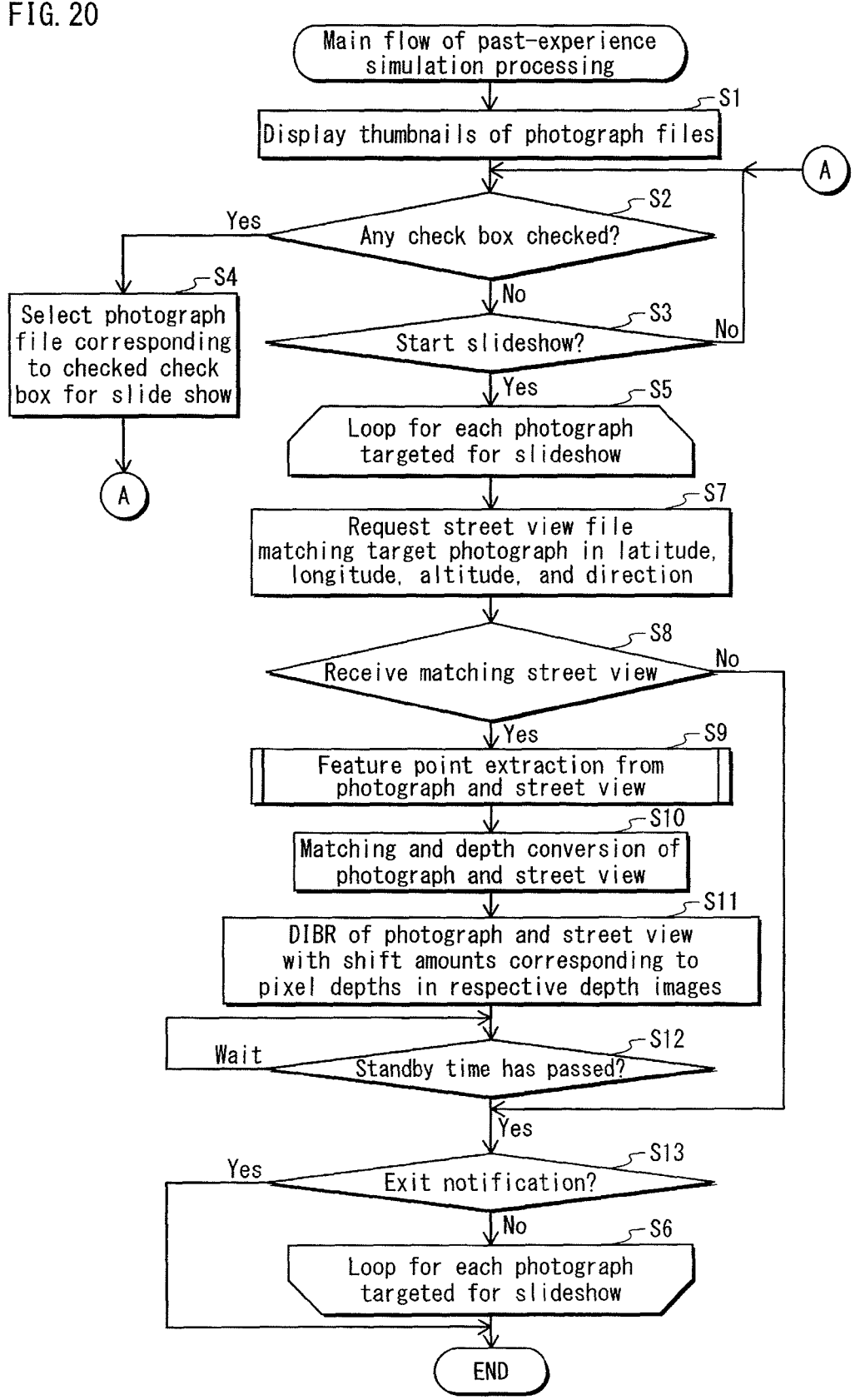
FIG. 20 is a main flowchart of past-experience simulation processing.

The following describes the processing steps that need to be realized in software implementation employing the architecture of a general-purpose computer system. FIG. 20 is a flowchart of a past-experience simulation processing. This flowchart relates to the highest level processing, i.e., the main retune. Flowcharts shown in FIGS. 21 and 22 relate subroutines of this main routine. The following describes the processing steps of the main routine.

In Step S1, thumbnails of photograph files are displayed in a list, and then the processing moves onto Step S2 and then to the loop starting at Step S3. In Step S2, a judgment is made as to whether any check box is sleeted to specify a photograph file for display. If any check box is selected, a photograph corresponding to the selected check box is designated as a target of slideshow (Step S4). Then, the processing goes back to Step 2 and then to Step S3 to repeat the loop.

In Step 3, a judgment is made as to whether an instruction to start a slideshow is given. In this step, the processing is placed in the stand-by state until a user operates the "Start Slideshow" button. Once the "Start Slideshow" button is operated, the loop between Steps S5 and S6 is executed for each stereoscopic image selected by the user. In the following description, the loop between Steps S5 and S6 is executed. In the loop, Steps S7-S13 is performed for each photograph selected for the slideshow.

In Step S7, an image acquisition request is generated using the geographic information (latitude, longitude, altitude, and direction) included in the stereoscopic photograph file currently subjected to the loop processing, and the acquisition request thus generated is transmitted to the global view collection server 1001. In Step S8, the processing is placed in the standby state for reception of a stereoscopic SV viewpoint file to be transmitted in response to the acquisition request transmitted in Step S7. Upon receipt of a stereoscopic SV viewpoint file, Step S9 is performed to extract feature points from the photograph and the street view. In Step S10, the matching between the photograph and the street view is performed, and the depth image conversion is also performed. In Step S11, DIBR of the photograph and the street view is performed, with the shift amounts determined according to the depth of individual pixels in a corresponding one of the photograph depth image and the street view depth image. Then, in step S12, the processing is placed into the standby state until a predetermined standby time passes. In Step S13, a judgment is made as to whether an exit notification is received. If no exit notification is received, the processing moves onto Step S6 to start processing the next photograph. The processing exits the loop between Steps S5 and S6, if Step S13 results in "Yes".

Figure 21:
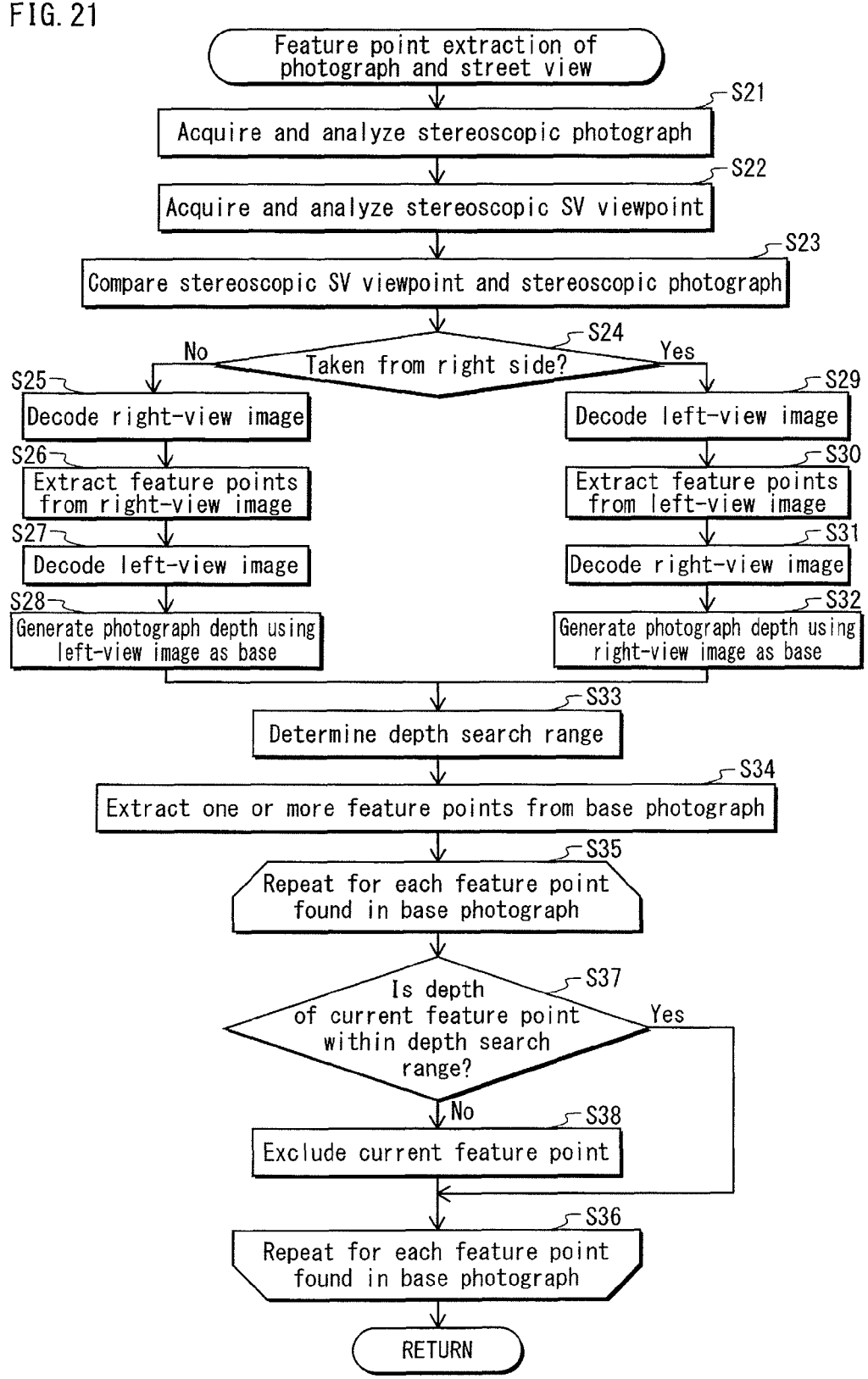
FIG. 21 is a flowchart showing the processing steps for extracting feature points from a photograph and a street view.

FIG. 21 is a flowchart showing the processing steps for extracting feature points from the photograph and the street view.

First, the stereoscopic photograph is acquired and analyzed (Step S21). Next, a stereoscopic SV viewpoint located closest to the location specified by the latitude and the longitude of the stereoscopic photograph is obtained and analyzed (Step S22). The stereoscopic photograph is compared with the stereoscopic SV viewpoint to see their correlation (Step S23) in order to determine whether the stereoscopic photograph was captured from the right side or the left side (Step S24). More specifically, the determination is made based on the value calculated by subtracting the direction of the stereoscopic photograph file from the direction of the SV viewpoint. If the calculated value falls between 180 to 360 degrees, the photograph is determined to be captured from the left side. On the other hand, if the calculated value falls between 0 to 180 degrees, the photograph is determined to have been captured from the right side.

When the photograph is determined to have been captured from the left side, the right-view image is decoded first (Step S25) and feature points are extracted (Step S26). Then, the left-view image is decoded (Step S27), and a photograph depth image is generated using the left-view image as the base image (Step S28).

When the photograph is determined to have been captured from the right side, the left-view image is decoded first (Step S29) and feature points are extracted (Step S30). Then, the right-view image is decoded (Step S31), a photograph depth image is generated using the right-view image as the base image (Step S32), and the depth search range is determined (Step S33). Thereafter, one or more feature points are extracted from the photograph used as the base image (Step S34) and then the loop between Steps S35 and S36 is executed. This loop is to repeat Steps S37 to S38 for every feature point appearing in the base photograph. In Step S37, a determination is made as to whether or not the median depth of the feature point currently subjected to the processing is within the depth search range. If the median depth falls outside the depth search range, the feature point is excluded in Step S38. Consequently, the feature point thus excluded is not used in the further matching.

Figure 22:
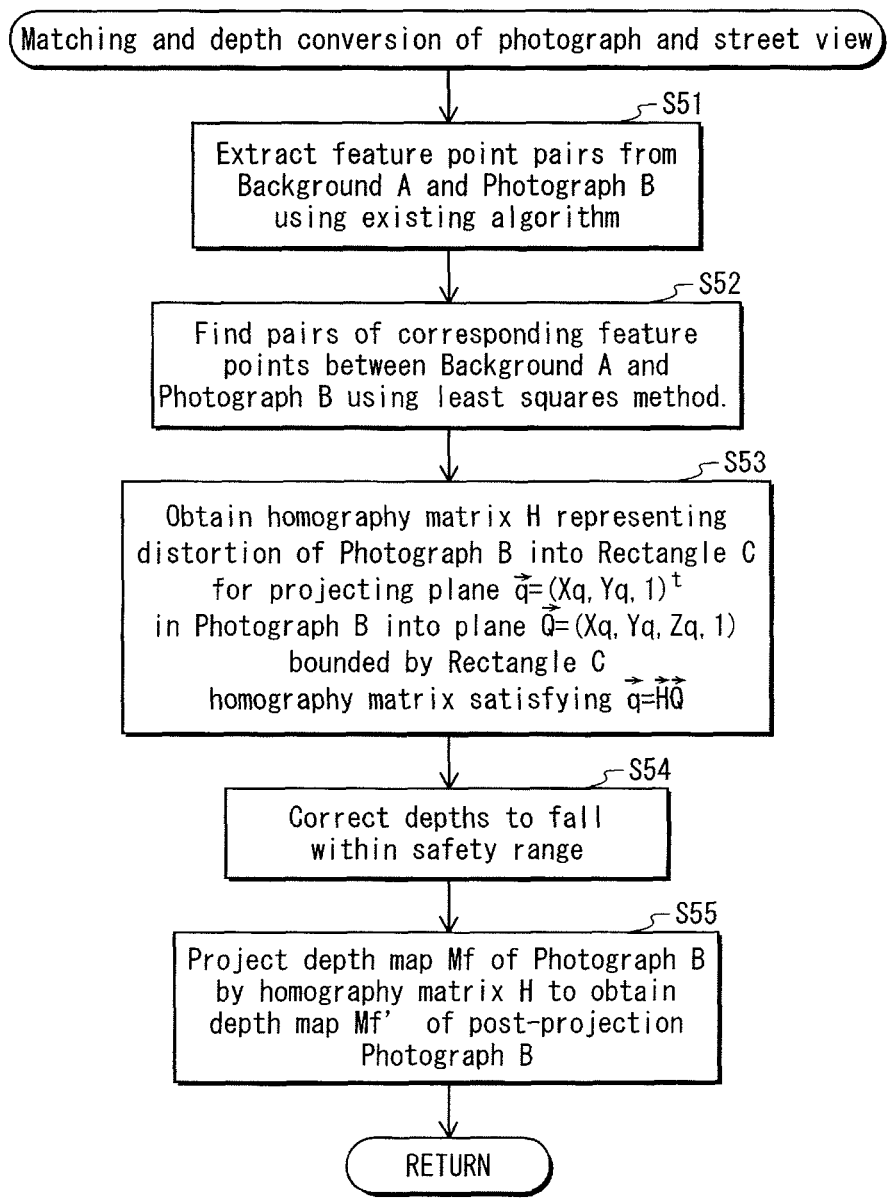
FIG. 22 is a flowchart showing the processing steps for matching between a photograph and a street view and also for depth image conversion.

FIG. 22 is a flowchart showing the processing steps for matching between a photograph and a street view and also for depth image conversion. In Step S51, a feature point depth image is extracted from each of the background image A and the photograph B with the use of an existing algorithm. In Step S52, the background image A and the photograph B are searched to find pairs of corresponding feature points by using the least squares method. In Step S53, a homography matrix is obtained for converting the photograph B into the rectangle C in order to project the photograph B onto a plane bounded by the rectangle C. In Step S54, the depth image is corrected so as to avoid the parallax between the maximum and minimum values from becoming too large and the disparities in the angle of convergence from becoming too large. In Step S55, the depth image Mf of the photograph B is projected by the homography matrix H to obtain the post-projection photograph depth Mf.

As a result of matching processing, a transformation matrix is derived which indicates (i) the feature points used for matching and (ii) the stereoscopic relationship between the stereoscopic photograph and the stereoscopic street view.

As described above, according to the present embodiment, the depth mapping is performed with the use of the depths of feature points subjected to the matching. This ensures that composite images of a panoramic image stored in a stereoscopic SV viewpoint file and a foreground image stored in a stereoscopic photograph file are played back stereoscopically with depths not causing an unnatural appearance.

In addition, by suppressing the depths of overall images relatively shallow, the resultant stereoscopic presentation can be viewed for a long time without causing much strain to the eyes, while maintaining natural depth perception. Furthermore, through the DIBR processing with the projected depth image, the resultant stereoscopic presentation of photographs is ensured not to be too pronounced.

(Embodiment 2)

This embodiment discloses hardware implementation of the image providing device described in the above embodiment.

Figure 23:
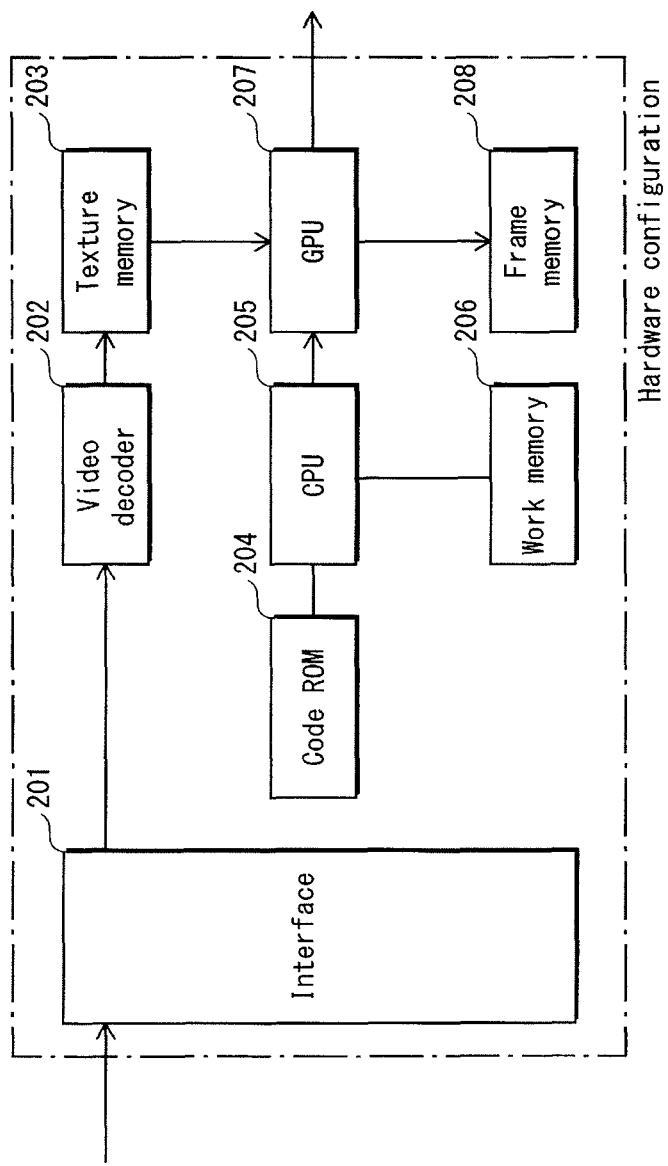
FIG. 23 illustrates the hardware configuration of an image providing device.

First, the hardware configuration of the CG processor is described. FIG. 23 illustrates the hardware configuration of the CG processor. As illustrated in the figure, the image providing device includes an interface 201, a video decoder circuit 202, a texture memory 203, a code ROM 204, a CPU 205, a work memory 206, a GPU 207, and a frame memory 208.

The interface 201 interfaces with a drive for a built-in medium or for a removable medium.

The video decoder 202 is a circuit dedicated for decoding background images and depth images read via the interface 201.

The texture memory 203 stores uncompressed background images decoded by the video decoder circuit 202.

The code ROM 204 stores a sequence of code of a program for realizing the processing steps shown in the above flowcharts.

The CPU 205 reads and executes a sequence of code stored on the code ROM 204 to realize the processing steps described in the above embodiment.

The work memory 206 is used as a memory area for variables and arrays used by the code ROM 204 during processing.

The GPU 207 is a circuit dedicated for graphics processing, such as texture mapping.

The frame memory 208 is memory used by the GPU 207 during processing.

Figure 24:
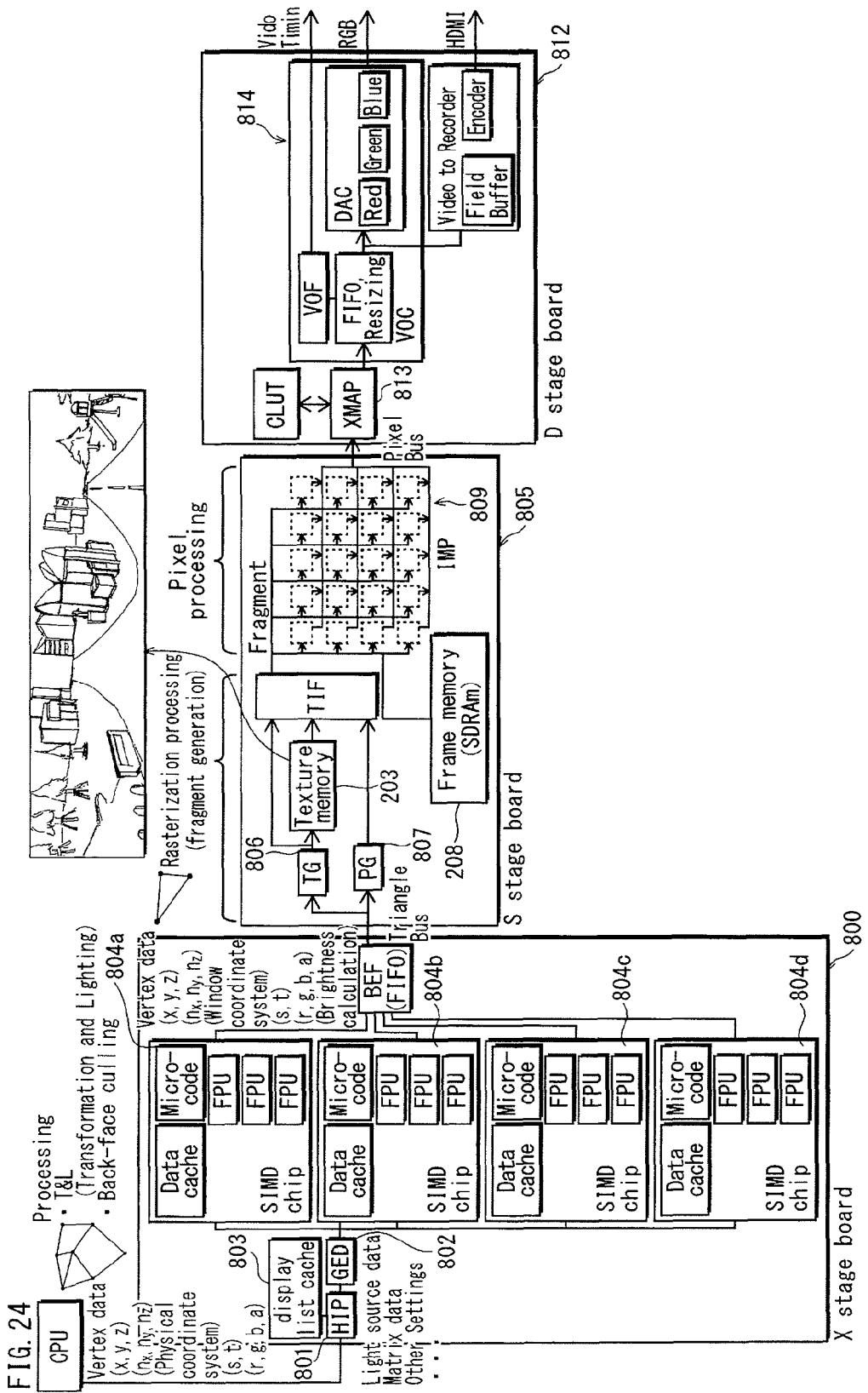
FIG. 24 illustrates the internal configuration of a GPU.

FIG. 24 illustrates the internal configuration of the GPU.

An X stage board 800 realizes processing in X (Transformation, Xformation) stage and includes an HIP 801, a GED 802, a display list cache 803, and SIMD chips 804a, 804b, 804c, and 804d. The processing of X (Transformation) stage roughly includes two processes. One is the transformation process of converting the coordinates (x, y, z) of each vertex in the three dimensional space to the coordinates on a two dimensional screen. The other is the lighting computation process for computing the brightness (color) and light casted on each vertex based on the information about the light source and texture. These two processes (Transformation and Lighting) are collectively referred to as "T & L process" or "TnL" process.

The HIP (Host Interface Processor) 801 is an ASIC (Application Specific Integrated Circuit) that interprets an OpenGL API call received as input and converts the call into a format suitable for computation.

The GED (Geometry Element Distributor) 802 plays the role of appropriately distributing the pieces of vertex data to the subsequent four SIMD chips by finding the chips in the standby state.

The display list cache 803 is cache memory for storing a display list in which OpenGL API calls are grouped. By preparing a series of frequently used OpenGL API calls in a display list, the amount of data transferred from the CPU to the X stage board can be reduced significantly.

The SIMD chips 804a, 804b, 804c, and 804d are each a single-chip processor realized as ASIC having three FPUs (floating-point units), a cache for storing microcode and a data cache. One FPU includes the following two arithmetic units. One is a common floating-point ALU (Arithmetic Logic Unit), and the other is a floating-point multiplier. The board in this embodiment is equipped with the four SIMD chips described above. In the FPU, 12 systems operate in parallel. Thus, 12 pieces of vertex data (x, y, z) can be simultaneously processed in parallel.

The details of the processing to be performed by the SIMD chips (i.e., algorithms for the coordinate conversion and lighting computation) are described in the form of microcode. Each arithmetic circuit operates according to the microcode stored on the cache on the chip. The microcode is loaded to the cache upon system activation. The arithmetic results by the SIMD chips are collected to FIFO (First-In First-Out) memory and transferred to a bus called Triangle Bus as output of the overall X stage board. Each piece of vertex data includes coordinates (x, y) and depth information z in the screen coordinate system, lighting computation result (r, g, b), transparency information a, normal vector (nx, ny, nz), and texture coordinates (s, t).

In addition, this board also performs pre-processing for improving the computation efficiency in the subsequent S stage. One typical pre-processing is back-face culling. Back-face culling refers to a process of detecting any triangle that appears as facing away from the viewpoint when converted into the window coordinate system. Any piece of vertex data relating to such a triangle is caused not to output to the Triangle Bus. This concludes the description of the X stage board.

The following now describes the S stage board 805. The S stage board 805 is composed of four different types of ASIC chips (TG 806, PG 807, TF 808, and IMP 809). The processes performed in the S (Scan conversion) stage include rasterization to color each pixel located inside a triangle, hidden surface removal, stencil masking, and fogging.

One important function in the rasterization process is texture mapping of applying a panoramic image onto the spherical strips. In the texture mapping, the address within a texture image stored in the texture memory is specified not by interpolating the brightness (r, g, b) but by interpolating the texture coordinates (s, t) to read an appropriate pixel. The brightness (r, g, b) of the read pixel is determined as the brightness data of the fragment.

Input to the S stage board is fragments of each vertex of a triangle received from the X stage board via the Triangle Bus. Each fragment is a piece of data including the screen coordinates (x, y, z), texture coordinates (s, t), brightness (r, g, b), transparency a, and nominal vector (nx, ny, nz).

The TG (Texture Generator) chip 806 fills a triangle, outputs the interpolation result of the texture coordinates (s, t) for each pixel, specifies an address in the texture memory, and passes the texture pixel (called texel) to the TF (Texture Filter).

The PG (Pixel Generator) chip 807 performs the rasterization process, i.e., fills the triangle, and interpolates the brightness (r, g, b) for each pixel.

The TF (Texture Filter) chip 808 composites the output of the PG (i.e., the brightness modified for shading) with the output from the texture memory (i.e., texle), and passes a fragment for each pixel to the IMP (Image Memory Processor).

The IMP (Image Processor) 809 is a processor for realizing a flow of pixel processing, involving fogging, anti-aliasing, alpha test, stencil test, depth test, blending, masking, and selection of a write buffer. The IMP 809 then writes the resultant data to the frame memory 208.

The D stage board 812 is for performing D-stage processes and provided with XMAP 813 and VOC 814.

The XMAP (Pixel Mapping Asic) 813 receives image data from the Pixel Bus, applies conversion with the use of a look-up table as necessary, and displays a cursor. Then, the XMAP 813 sends the resulting image data on to the Video Packet Bus. Each VOC picks up an image according to the VOF data describing a rectangular region to be processed by the respective VOC and converts the data into a video signal by a DA converter.

The VOC (Video Output Channel) circuit 814 includes an output circuit for magnifying an image, and a filtering circuit for improving the image quality of the magnified image. When the processing load increases, the VOC circuit 814 renders an image at dynamically lowered resolution and enlarges the rendered image by a hardware function to restore the initial image. The stage board has eight output channels at maximum and also has an HDMI output encoder.

Next, a description is given of controls of the GPU, which is a hardware component, to be instructed by software.

Figure 25:
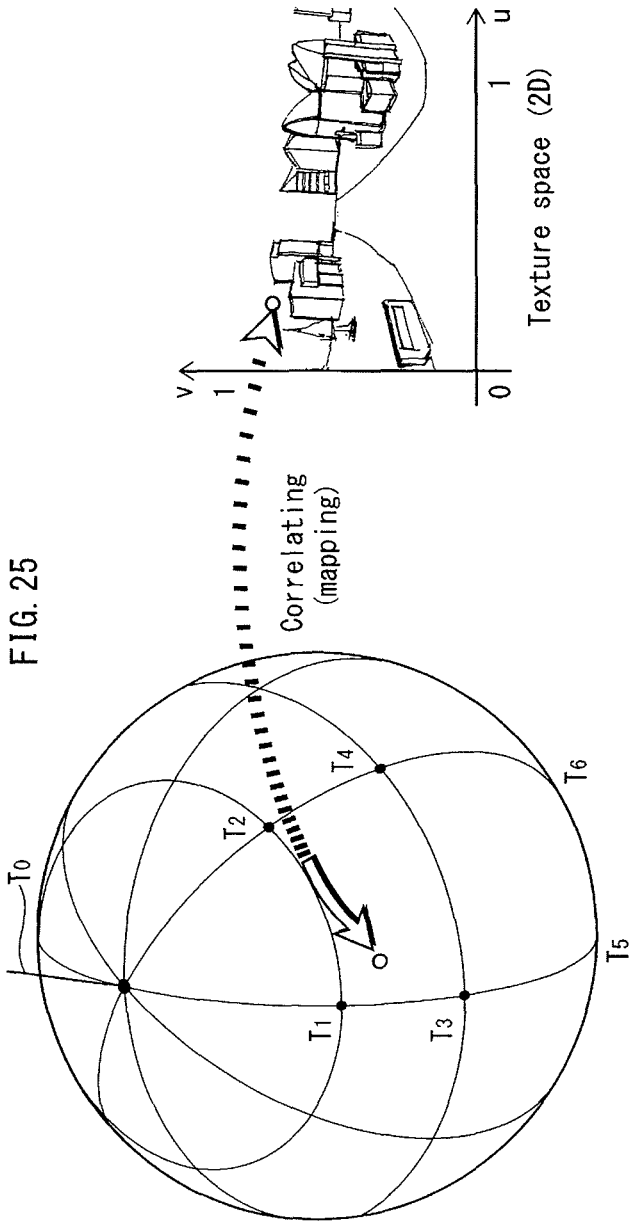
FIG. 25 illustrates mapping between a spherical model and texture and also illustrates an example description of an API call for realizing texture mapping.

FIG. 25 illustrates, at the top portion, the mapping between the spherical model and texture. In the figure illustrates, at the top, the grid of the spherical model, and the right hand side shows the stored content (i.e., textures) of the texture buffer. The spherical model illustrated on the left hand side is divided into W regions along a lateral direction and a texture is to be applied to each region. In the present embodiment, a geometry subjected to texture mapping is a triangle strip. The entire or a portion of a triangle strip is subjected to texture mapping. The entire or portion of triangle strip is defined by a vertex grid. More specifically, a grid defined by points T1, T2, and T3 is subjected to texture mapping, and a grid defined by points T3, T4, T5, and T6 is subjected to another texture mapping. The coordinates describing each point defining the grids are designated as indices used in texture mapping.

The bottom portion of FIG. 25 is an example description of an OPEN-GL API call for realizing texture mapping.

The statement "glVertexPointer (3, GL#FLOAT, 0, g#v);" is for storing the series of coordinates describing the points of a grid in the three-dimensional modeling space as vertices. The argument "3" is the number indicating the dimensions of the three-dimensional modeling space, and "GL#FOLAT" indicates that each coordinate is floating-point type data.

The statement "glTexCoordPointer(2, GL#FLOAT, 0, g#uv):" is an API call for storing a series of texture coordinates g#uv corresponding vertices of the grid in the three-dimensional modeling space as texture coordinate values.

The statement "for(I=0;i<W;i++)" defines a loop of repeating "glDrawElements" for each of W coordinates in the lateral direction.

The following describes the statement "glDrawElements (GL#TRIANGLE#STRIP, (H+1)*2, GL#UNSIGNED#SHORT, getStaticData()->g#index[i]);". The first argument in this API call indicates that the geometry of the 3D model is a triangle strip (GL#Triangle#Stirp). The second argument specifies the number of vertices. Here, the number is specified as (the vertical division number H+1)×2. The statement "GL#UNSIGNED#SHORT" specifies that the type of index sorting vertices is of a short format, which is without a sign. The statement "g#index[W]" is an index array determining the order of rendering and the coordinates describing each intersection of the grid is stored as an element of the array. Through rendering by following the coordinates of vertices stored as the array elements of "g#index", texture mapping is carried out.

First, the following describes the hardware configuration for realizing DIBR (that is, the hardware configuration of the SV memory 18, the street view DIBR unit 21, the right-view photograph memory 13*a*, the left-view photograph memory 13*b*, and the photograph DIBR processing unit 28 is described).

The SV memory 18 is composed of a plurality of line memories each of which is in turn composed of a plurality of 32-bit memory elements. SV data is stored in the 32-bit memory elements. The coordinates of SV data on a screen are defined, for example, by pairs each made up of a ROW address and a COLUMN address in the SV memory. A ROW address specifies a line memory in the SV memory, and a COLUMN address specifies a memory element in the related line memory. This concludes the description of the SV memory 18. The following now describes the hardware configuration of the street view DIBR processing unit 21.

The street view DIBR processing unit 21 performs DIBR of the left-view SV using the street view depth image to generate a right-view street view. As described above, the screen coordinates of a point on a street view are defined by a pair of a ROW address specifying a line memory and a COLUMN address specifying a memory element in the line memory. Therefore, the street view for the other one of the right- and left-view is obtained by increasing or decreasing each COLUMN address specifying the memory element of the street view memory by the amount corresponding to the parallax represented by the depth of the corresponding pixel in the street view depth. The left-view SV is generated by changing the X coordinate of the street view by the amount corresponding to the parallax X, which is represented by the depth of a corresponding pixel in the street view depth. To this end, the street view is copied from the SV memory 18 to the texture memory 22*a*. At the time of copying, the COLUMN address specifying the memory element used to store the copy of the street view needs to be adjusted to an address that is closer to the top by the number of pixels X. By copying the street view to the address adjusted in the above manner, the resulting left-view street view is shifted to the left. Thus, to generate the left-view SV, the street view DIBR unit 21 performs DIBR on the basis of the street view depth, through copying the street view from the SV memory 18 to the texture memory 22*a* after the address adjustment.

Similarly, the right-view SV is generated by changing the X coordinate of the street view. To this end, the street view is copied from the SV memory 18 to the texture memory 25b after adjusting the COLUMN address specifying the memory element used to store the copy of the street view to an address that is closer to the bottom by the number of pixels X. By copying the street view to the address adjusted in the above manner, the resulting right-view street view is shifted to the right. Thus, to generate the right-view SV the street view DIBR unit 21 performs DIBR on the basis of the street view depth, through the process involving the address adjustment to copy the street view from the SV memory 18 to the texture memory 22b.

This concludes the description of the street view DIBR unit 21. The following now describes the details of the right-view photograph memory 13a and the right-view photograph memory 13b.

The right-view photograph memory 13a and the left-view photograph memory 13b are also each composed of a plurality of line memories, and each line memory is in turn composed of a plurality of 32-bit memory elements. Each pixel data of a photograph is stored into an appropriate one of 32-bit memory. The coordinates of photograph data on a screen are defined, for example, by pairs each made up of a ROW address and a COLUMN address. A ROW address specifies a line memory of a video plane, and a COLUMN address specifies a memory element in the related line memory. This concludes the description of the right-view photograph memory 13a and the right-view photograph memory 13b. Similarly to the above, the photograph DIBR processing unit 28 performs DIBR of a photograph through the copying process involving the address adjustment.

Next, the description is given of how the shift amounts for the street view DIBR unit 21 and the photograph DIBR processing unit 28 are determined by hardware. As a representative description, a description related to the street view DIBR unit 21 is given. The street view DIBR unit 21 fetches image data composed of 512 (wide)×512 (high) pixels from the SV memory 18 and also fetches a depth image composed of 512 (wide)×512 (high) pixels from the SV depth memory 20. Using the 512×512-pixel depth image as the base, the street view DIBR unit 21 performs DIBR of the 512×512 pixels. The following describes the parallax settings of each pixel for pixel shifting. Suppose that the depth from the viewpoint to a pixel located at the coordinates (x, y) in a depth image is denoted as Depth(x, y), then the conversion from the intensity Y(x, y) to Depth(x, y) of the pixel is made by the following formula, for example.

$$Y(x,y)=255-(\log(Depth(x,y)+1)\times 100) \quad \text{(Formula)}$$

The thus obtained Depth(x, y) is then converted into the number of pixels denoted as offset(x, y) correspondingly to the screen size of a display, which enables the intensity values of pixels to be converted to appropriate parallax values.

Figure 26:
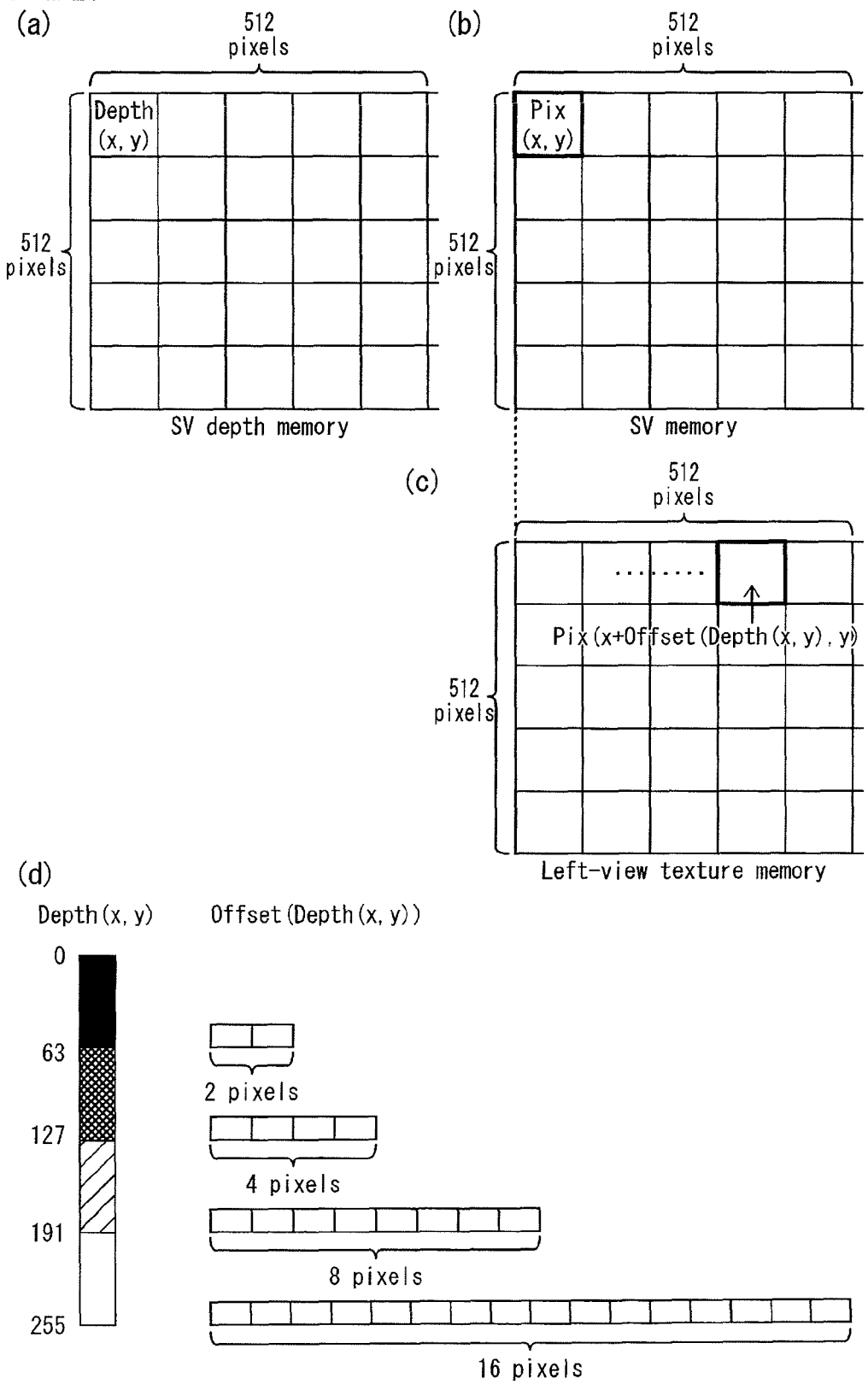
FIG. 26 illustrates a pixel Pix(x, y) at the coordinates (x, y) in respective depth image memories as well as the depth Depth(x, y) to the pixel located at the coordinates (x, y).

In the DIBR, an image as seen from another viewpoint is obtained by shifting each pixel of an image subjected to DIBR by an appropriate shift amount in the following manner. That is, to shift a pixel located at given coordinates (x, y), an offset(Depth(x, y), y) is calculated uniquely for the coordinates (x, y) from the Depth(x, y) derived from the intensity Y(x, y) of the pixel located, in the associated depth image, at the coordinate (x, y). The thus derived offset(Depth(x, y), y) is used as the shift amount. FIG. 26(a) illustrates the depth Depth(x, y) of the pixel located at the coordinates (x, y) in the depth image. Note that Depth(x, y) corresponds in position to Pix(x, y) illustrated in FIG. 26(b). FIG. 26(b) illustrates a pixel Pix(x, y) located at the coordinates (x, y) in the image memory. FIG. 26(c) illustrates the amount of shift made to the pixel Pix(x, y) for generating a left-view texture. In FIG. 26(c), Pix(x, y) is shifted horizontally in the SV image memory 18 by the amount shown by Offset(Depth(x, y)). Therefore, the pixel Pix after the shift is located at the confidantes (x+Offset(Depth(x, y)), Y). Offset(Depth(x, y) denotes an offset that is unique to a pixel at the coordinates x, y in a panoramic image and is set according to Depth(x, y) derived from the intensity value of a corresponding pixel in the depth image.

To prepare images as seen from two or more different viewpoints, the amount of horizontal shift to be made to generate an image as seen from a viewpoint differs for each pixel in the image. The relation between the intensity level of a pixel in a depth image and the number of pixels serving as a corresponding shift amount is given by the formula listed above. In one example of the relation, the settings illustrated in FIG. 26(c) are possible.

FIG. 26(c) illustrates the intensity levels of a pixel Y(x, y) ranging from 0 to 255, each along with a corresponding offset indicated by the number of pixels ranging from 1 to 16. In the figure, the offset range from 0 to 2 pixels is assigned to the intensity range from 0 to 63, the offset range from 3 to 4 pixels is assigned to the intensity range from 64 to 127, the offset range from 5 to 8 pixels is assigned to the intensity range from 128 to 191, and the offset range from 9 to 16 pixels is assigned to the intensity range from 192 to 255. That is, non-linear correspondence is established such that the intensity range corresponding to brighter pixels are assigned with a larger parallax, and the indentify level range corresponding to darker pixels are assigned with a smaller parallax.

Figure 27:
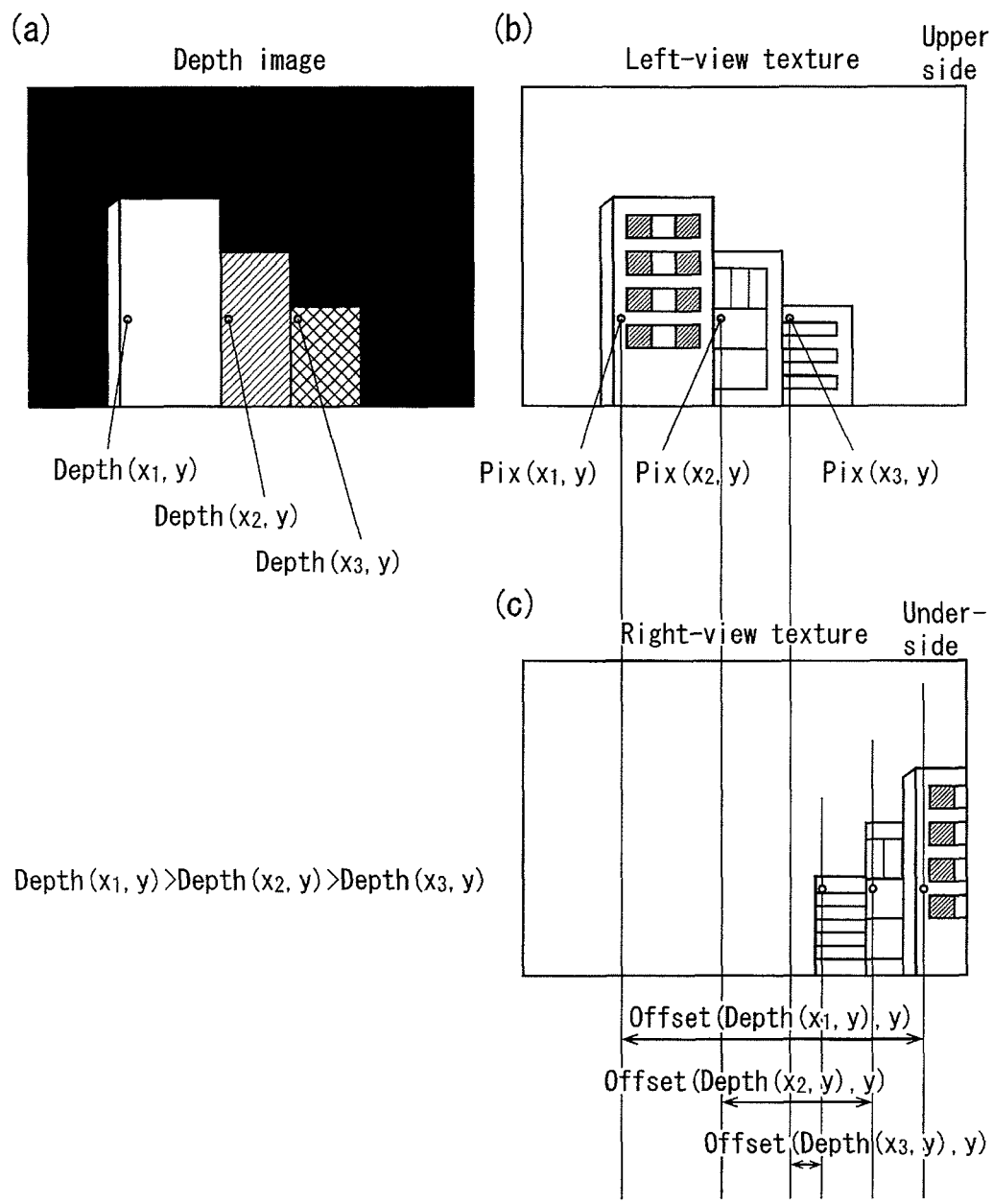
FIG. 27 illustrates the parallax provided in the left-view texture and the right-view texture as a result of pixel shift.

FIG. 27 illustrates the parallax provided in the left-view texture and the right-view texture as a result of pixel shift. FIG. 27(a) illustrates a depth image, FIG. 27(b) illustrates the stored content of the left-view texture memory, and FIG. 27(c) illustrates the stored content of the right-vie texture memory.

In FIG. 27(b), Pix(x1, y) is a pixel that belongs to the building appearing closest toward the front out of the three buildings in the image. Pix(x2, y) is a pixel belonging to the second building out of the three buildings. Pix(x3, y) is a pixel belonging to the third building out of the three buildings.

FIG. 27(a) is an example of a depth image and illustrates the depths to respective pixels Pix(x1, y), Pix(x2, y), and Pix(x3, y) in the left-view texture. Specifically, Depth(x1, y) indicates the depth to Pix(x1, y) in the left-view texture. Depth(x2, y) indicates the depth to Pix(x2, y) in the left-view texture. Depth(x3, y) indicates the depth to Pix(x3, y) in the left-view texture.

At the bottom, FIG. 27(c) illustrates the offset given to each pixel in DIBR. Specifically, Offset(Depth(x1, y), y) indicates the offset given to Pix(x1, y) in the left-view texture. Similarly, Offset(Depth(x2, y), y) indicates the offset given to Pix(x2, y) in the left-view texture, and Offset(Depth(x3, y), y) indicates the offset given to Pix(x3, y) in the left-view texture. As shown in the figure, the relation Depth(x1, y)>Depth(x2, y)>Depth(x3, y) is true, so that pixels of the building closest toward the front are given the largest parallax. As a result, the building appears to largely pop out of the screen.

As described above, in DIBR, the shift amount of each pixel differ depending on the intensity value of a corresponding pixel in the depth image. Thus, by employing arithmetic operation units to calculate an appropriate offset value from the intensity value of a corresponding pixel in the depth image, the street view DIBR unit 21 and the photograph DIBR processing unit 28 are duly implemented by hardware components.

<Supplemental>

Up to this point, the best mode embodiments known to the applicant at the time of filing the present application have been described. With respect to the following technical topics, further improvements and modifications may be made. Each embodiment is practiced as described above and whether or not to make these improvements and modifications are optional and up to discretion of those who practice the embodiments.

(Increasing or Decreasing Angle of Panoramic Images)

In each embodiment, the description is directed to a panoramic image prepared by stitching seven background images in a row direction. However, the number of background images stitched together in a row direction may be reduced, which results in a change in the angle covered by the street view that can be seen from the viewpoint. In the above embodiments, a panoramic image covers the 360° field of view with seven background images arranged in a row. Thus, the angle covered by one background image is 52° ($\approx$365°/7). That is, by combining two images, the resultant image provides the field of view angle of 104° ($\approx$52°×2), and by combining three images, the resultant combined image provides the field of view angle of 156° ($\approx$52°×3). In this manner, by changing the number of images combined in a row direction by a street view collection server or image providing device, the field of view angle covered by the resultant panoramic image can be changed to reduce the processing load of texture mapping, computation of parallaxes in texture, and so on.

(Feasibility by Line Scan Circuit)

DIBR may also be realized by a line scan circuit. A line scan circuit is a hardware component for reading a set of pixels (1920×1080) for one screen from a frame memory in units of 1920 pixels to convert the read pixels into a video signal. The line scan circuit is realized by a line-pixel memory for storing pixel data for one line of an image, a filter circuit, and a conversion circuit for parallel/serial conversion. As described above, DIBR refers to processing for converting the intensity value of each pixel in a depth image into a corresponding parallax to shift the pixel. The coordinates of each pixel constituting one line of a panoramic image read to the line memory are shifted by the number of pixels represented by the depth of a corresponding line in the depth image of the panoramic image. As a result, an image as seen from a different viewpoint is created in a manner to appropriately reflect the depths shown by the depth image.

(Variations of Depth Images)

A compressed Mercator depth image 803 has been described as PNG data prepared by compressing an image representing depths of a Mercator image. Since noise in depth data compression tends to be noticeable, lossless compression such a PNG format is preferable. Note that the data of the compressed Mercator depth image 803 in the stereoscopic street view 801 is redundant. Therefore, in addition to compressed data resulting from PNG compression, the stereoscopic street view 801 may include (i) surrounding terrain data and (ii) data indicating the relationship between the compressed Mercator image 802 and the surrounding terrain data. Note that in the case of transmitting or receiving the stereoscopic street view 801 over the Internet, the compressed Mercator image may be divided into a plurality of files. This makes it possible to display the compressed Mercator image even during download of the stereoscopic street view 801. Besides, it is made possible to perform the processing of the SV decoder 218 in parallel with the processing of the SV feature extractor. As a result, the overall processing is performed at high speed.

(Embodiments of Integration Circuit)

Regarding the hardware configuration of the playback device described in Embodiment 1, portions other than mechanical portions (such as the drive unit of a recording medium and the connectors to external sources) may be implemented as a system LSI. That is, portions corresponding to logic circuits and memory elements, i.e., cores of the logic circuits may be implemented as a system LSI. A system LSI refers to a package of bare chips mounted on a high-density substrate. A multi-chip module is a package of a plurality of bare chips mounted on one high-density substrate and thus has an external appearance like a single LSI. Such a multi-chip module is also encompassed within the scope of a system LSI.

Focusing on the types of packages, system LSIs include the following two types: QFP (Quad Flat Package) and PGA (pin grid array). QFP refers to a system LSI package having pins extending from each of the four sides. PGA refers to a system LSI package having a number of pins attached to the entire underside of the package.

These pins play the role of power feed, ground, and an interface with other circuits. Since the pins of the system LSI functions as an interface, by connecting other critics to the pins, the system LSI acts as the core of the playback device.

(Technical Significance of Processing Either of Left- or Right-View Images)

In DIBR of a stereoscopic photograph, the stereoscopic photograph is rendered to appear toward the front and thus stands out. This allows the resulting past-experience image to be even more eye-pleasing.

Although the description of the present embodiment is directed to a stereoscopic photograph, the present embodiment is similarly applicable to moving images. In the case of a moving image, processing may be performed on each frame of the moving image treated as a still image.

(Specifics of Arithmetic Based on Formulas)

In the embodiments above, the arithmetic operations are disclosed based on the specific formulas. These formulas represent numeric operations executed on a computer, rather than mathematical concepts. It is therefore naturally appreciated that revisions are made as necessary for rendering the formula executable by a computer. For example, it is an appropriate to perform a saturation calculation for handling numeric values appropriately as integer type, fixed-point type, or floating-point type values or to perform a positive conversion. In addition, among the arithmetic operations based on the formulas shown in the above embodiments, a multiplication by a constant may be implemented with a ROM multiplier that uses a constant ROM. In the constant ROM, the products of possible multiplicands and the constant are calculated and stored in advance. Suppose, for example, that a possible multiplicand is 16-bit long at maximum. In this case, the multiplicand is divided into four 4-bit data pieces and the product of a multiplication by the constant is calculated for each four-bit data piece and stored in the constant ROM. That is, multiples of the constant by each numeral from 0 to 15 are stored in the constant ROM. Since a product of a 4-bit data piece and a 16-bit constant is 20 bits and four constants are stored at the same address, one word will be 80 bit-long (20×4=80). As described above, as an "arithmetic operation" used in the present disclosure can be implemented by a ROM multiplier and therefore the term "arithmetic operation" used in the present disclosure refers not only to a pure mathematical operation. Rather, the term encompasses reading of an appropriate one of arithmetic results from a recording medium such as ROM, according to the value of a multiplication.

(Embodiments of Programs)

The programs shown in the above embodiments may be made in the following way. First, a software developer describes in a programming language a source program for realizing flowcharts or functional components described above. When describing the source program for realizing the flowcharts or functional components, the software developer follows the syntax of the program language and uses class structures, variables, array variables, and external function calls.

The source program thus described is then supplied in a file to a complier. The complier interprets the source program into an object program.

The interpretation by the complier involves processes, such as parsing, optimization, resource allocation, and code generation. In the process of parsing, the lexical analysis, syntactic analysis, and semantic analysis are performed to convent the source program into an intermediate program. In the process of optimization, the intermediate program is subjected to partitioning into basic blocks, control flow analysis, and data flow analysis. In the process of resource allocation, variables used in the intermediate program are allocated to the registers or memories of a processor targeted for execution of the resulting program to for adaptation to instruction sets for the targeted processor. In the process of code generation, intermediate instructions in the intermediate program are converted into program code to obtain an object program.

The object program thus generated is composed of one or more lines of program code for causing execution of a step or a procedure of a functional component described in the above embodiments. The program code may be of various types, including native code of a processor and JAVA(™) bytecode. The program code may realize the steps in various manners. In the case where each step may be realized by using an external function, then a call instruction to involve the external function serves as lines of program code. In another case, lines of program code for realizing a single step may be included in separate object programs. In the case of a RISC processor that uses only limited types of instructions, each step of the flowchart may be realized by a combined uses of an arithmetic instruction, a logical instruction, a branching instruction, and the like.

Once such an object program is ready, a programmer activates a linker for the object program. The linker allocates the object program and related library programs to memory spaces and combines all the programs into a single load module. The load module thus generated is to be read and executed by a computer to realize the processing steps shown in the flowcharts or the procedures of the functional components. Such a computer program may be stored on a non-transitory computer readable recording medium and provided to users.

(Variations of Stereoscopic Playback)

To realize stereoscopic playback, a left-view texture and a right-view texture are described to be generated from one panoramic mage. Alternatively, the panoramic image as-is may be used as the left-view texture and only the right-view texture may be newly generated. Conversely, the panoramic image as-is may be used as the left-view texture and the right-view texture may be newly generated. In this alternative, the right-view camera position is assumed to be offset by 2×p from the camera position of the stereoscopic playback. It is then suffice to perform the coordinate conversion, texture mapping, and viewport conversion based on the assumed camera position in the above described manner.

INDUSTRIAL APPLICABILITY

The image providing device according to the present invention can be commercially, continuously, and repeatedly manufactured and sold in the manufacturing industry. In particular, the providing device is useful in the consumer product industry related to creation and reproduction of photographic contents.

REFERENCE SIGNS LIST

1a Network interface
1b Input interface
1c Built-in medium
2 File system
3 UO module
4 Control unit
5 Rendering unit

The invention claimed is:

1. An image providing device for compositing foreground image data with background image data after applying the background image data to an inner surface of a three-dimensional model in a three-dimensional modeling space, the image providing device comprising:

a reader operable to access a recording medium to read a stereoscopic photograph file containing left-view photograph data, right-view photograph data, and geographic information;

a transmitter operable to generate, with use of the geographic information contained in the stereoscopic photograph file, an image acquisition request that specifies a location of a current viewpoint in the geographic information, and to transmit the image acquisition request to an image collection server;

a receiver operable to receive a street view file transmitted from the image collection server in response to the image acquisition request, the street view file containing the background image data and having a location attribute matching the geographic information included in the image acquisition request;

an extractor operable to extract feature points from foreground image data, which is one of the left-view photograph data and the right-view photograph data determined as base image data, and from the background image data;

a matcher operable to search for a pair of feature points matching between the foreground image data and the background image data and obtain a transformation matrix for projecting the foreground image data onto the background image data, by using the pair of matching feature points;

a transformer operable to determine the one of the left-view photograph data and the right-view photograph data as the base image data, by comparing an image capturing direction of the background data with an image capturing direction of each photographic image, and to apply, to foreground depth data associated with the foreground image data, a transformation represented by the transformation matrix obtained by the matcher;

a depth-based renderer operable to perform depth-based rendering of the foreground image data based on the transformed foreground depth data, thereby to generate two or more pieces of viewpoint image data corresponding to the foreground image data; and a compositor operable to composite the two or more pieces of viewpoint image data corresponding to the foreground image data with two or more pieces of viewpoint image data corresponding to the background image data.

2. The image providing device according to claim 1, wherein
a transformation matrix H is given by Formula 1 below, $$\vec{Q} = \begin{bmatrix} X_F \\ Y_F \\ Z_F \end{bmatrix}$$ [Formula 1]

$$\vec{q} = \begin{bmatrix} x_f \\ y_f \\ 1 \end{bmatrix}$$

$$\vec{q} = \overrightarrow{HQ}$$

where xf and yf are X and Y coordinates of a feature point f(xf, yf) on the foreground image data,
XF and YF are X and Y coordinates of a corresponding feature point F(XF,YF) on the background image data to the feature point f(xf, yf), and
ZF is a depth value of the feature point F(XF, YF).

3. The image providing device according to claim 1, further comprising:
an acquirer operable to acquire photographic image data captured by a stereoscopic camera, the captured photographic image data including the right-view photograph data and the left-view photograph data.

4. The image providing device according to claim 3, further comprising:
a depth image generator operable to generate a depth image of the photographic image data from the right-view photograph data and the left-view photograph data, wherein
the foreground depth data subjected to the transformation by the transformer is the depth image generated by the depth image generator.

5. The image providing device according to claim 3, wherein
one of the right-view photograph data and the left-view photograph data not determined as the base image data is designated as non-base image data,
the depth-based renderer is operable to re-generate image data by applying horizontal shift to pixels of the non-base image data according to depths represented by the foreground depth data, and
the two or more pieces of viewpoint image data are composed of the non-base image data and the re-generated image data.

6. The image providing device according to claim 1, wherein
a permissible level of a depth of feature points to be searched for is set in advance in the image providing device, and
when searching the foreground image data for feature points for matching with a street view viewpoint, the matcher is operable to exclude any feature point having a median of depth distribution falling outside a permissible range, and perform matching between the background image data and the foreground image data using feature points each having a median of depth distribution falling within the permissible range.

7. The image providing device according to claim 1, wherein
the background image is a panoramic image as seen from a geographic location corresponding to the geographic information included in the image acquisition request.

8. An image providing method for compositing foreground image data with background image data after applying the background image data to an inner surface of a three-dimensional model in a three-dimensional modeling space, the image providing method comprising:
accessing a recording medium to read a stereoscopic photograph file containing left-view photograph data, right-view photograph data, and geographic information;
generating, with use of the geographic information contained in the stereoscopic photograph file, an image acquisition request that specifies a location of a current viewpoint in the geographic information, and transmitting the image acquisition request to an image collection server;
receiving a street view file transmitted from the image collection server in response to the image acquisition request, the street view file containing the background image data and having a location attribute matching the geographic information included in the image acquisition request;
extracting feature points from the foreground image data, which is one of the left-view photograph data and the right-view photograph data determined as base image data, and from the background image data;
searching for a pair of feature points matching between the foreground image data and the background image data and obtaining a transformation matrix for projecting the foreground image data onto the background image data, by using the pair of matching feature points;
determining one of the left-view photograph data and the right-view photograph data as the base image data, by comparing an image capturing direction of the background image data with an image capturing direction of each photographic image, and applying, to foreground depth data associated with the foreground image data, a transformation represented by the transformation matrix obtained in the searching;
performing depth-based rendering of the foreground image data based on the transformed foreground depth data, thereby to generate two or more pieces of viewpoint image data corresponding to the foreground image data; and
compositing the two or more pieces of viewpoint image data corresponding to the foreground image data with two or more pieces of viewpoint image data corresponding to the background image data.

9. A non-transitory computer-readable medium including an image providing program for causing a computer to execute processing to composite foreground image data with background image data after applying the background image data to an inner surface of a three-dimensional model in a three-dimensional modeling space, the image providing program causing the computer to perform:
accessing a recording medium to read a stereoscopic photograph file containing left-view photograph data, right-view photograph data, and geographic information;
generating, with use of the geographic information contained in the stereoscopic photograph file, an image acquisition request that specifies a location of a current viewpoint in the geographic information, and transmitting the image acquisition request to an image collection server;
receiving a street view file transmitted from the image collection server in response to the image acquisition request, the street view file containing the background image data and having a location attribute matching the geographic information included in the image acquisition request;

extracting feature points from the foreground image data, which is one of the left-view photograph data and the right-view photograph data determined as base image data, and from the background image data;

searching for a pair of feature points matching between the foreground image data and the background image data and obtaining a transformation matrix for projecting the foreground image data onto the background image data, by using the pair of matching feature points;

determining one of the left-view photograph data and the right-view photograph data as the base image data, by comparing an image capturing direction of the background image data with an image capturing direction of each photographic image, and applying, to foreground depth data associated with the foreground image data, a transformation represented by the transformation matrix obtained in the searching;

performing depth-based rendering of the foreground image data based on the transformed foreground depth data, thereby to generate two or more pieces of viewpoint image data corresponding to the foreground image data; and compositing the two or more pieces of viewpoint image data corresponding to the foreground image data with two or more pieces of viewpoint image data corresponding to the background image data.

* * * * *